US012767125B2

(12) United States Patent
Gariepy et al.

(10) Patent No.: US 12,767,125 B2
(45) Date of Patent: Oct. 20, 2026

(54) SYSTEMS AND METHODS FOR OPERATING ONE OR MORE SELF-DRIVING VEHICLES

(71) Applicant: CLEARPATH ROBOTICS INC., Kitchener (CA)

(72) Inventors: Ryan Christopher Gariepy, Kitchener (CA); Yvan Geoffrey Rodrigues, Kitchener (CA); Matthew Lord, Kitchener (CA); Ivor Wanders, Kitchener (CA); Jason Mercer, Kitchener (CA); James Servos, Kitchener (CA); Roydyn Clayton, Kitchener (CA)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 0 days.

(21) Appl. No.: 18/645,748

(22) Filed: Apr. 25, 2024

(65) Prior Publication Data

US 2024/0270240 A1 Aug. 15, 2024

Related U.S. Application Data

(63) Continuation of application No. 17/470,087, filed on Sep. 9, 2021, now Pat. No. 12,122,367.

(Continued)

(51) Int. Cl.

*B60W 30/09* (2012.01)
*B60W 30/165* (2020.01)

(Continued)

(52) U.S. Cl.

CPC .......... *B60W 30/09* (2013.01); *B60W 30/165* (2013.01); *G01C 21/343* (2013.01); *G01C 21/3667* (2013.01)

(58) Field of Classification Search

CPC ............... B60W 30/09; B60W 30/165; B60W 2552/53; B60W 60/001; B60W 30/182;

(Continued)

(56) References Cited

U.S. PATENT DOCUMENTS

| | | | |
|---|---|---|---|
| 5,023,790 | A | 6/1991 | Luke, Jr. |
| 5,525,884 | A | 6/1996 | Sugiura et al. |

(Continued)

FOREIGN PATENT DOCUMENTS

| | | | |
|---|---|---|---|
| CN | 109187063 | A | 1/2019 |
| CN | 108839025 | B | 10/2020 |

(Continued)

OTHER PUBLICATIONS

Bengel et al., "Mobile Robots for Offshore Inspection and Manipulation", Oct. 2009, the 2009 IEEE/RSJ International Conference on Intelligent Robots and Systems. (Year: 2009).

(Continued)

*Primary Examiner* — Abby Lin
*Assistant Examiner* — Danielle M Jackson

(57) ABSTRACT

The various embodiments described herein generally relate to systems and methods for operating one or more self-driving vehicles. In some embodiments, the self-driving vehicles may include a vehicle processor being operable to: control the vehicle to navigate an operating environment in an initial vehicle navigation mode; monitor for one or more trigger conditions indicating a possible change for the vehicle navigation mode; detect a trigger condition; determine a prospective vehicle navigation mode associated with the detected trigger condition; determine whether to change from the initial vehicle navigation mode to the prospective vehicle navigation mode; and in response to determining to change from the initial vehicle navigation mode to the prospective vehicle navigation mode, adjust one or more (Continued)

vehicle attributes corresponding to the prospective vehicle navigation mode, otherwise continue to operate the vehicle in the initial vehicle navigation mode.

18 Claims, 12 Drawing Sheets

Related U.S. Application Data

(60) Provisional application No. 63/076,661, filed on Sep. 10, 2020.

(51) Int. Cl.
*G01C 21/34* (2006.01)
*G01C 21/36* (2006.01)

(58) Field of Classification Search
CPC .. G01C 21/343; G01C 21/3667; G01C 21/20; G05D 1/024; G05D 1/0261; G05D 1/0263; G05D 1/0274; G05D 1/0297
See application file for complete search history.

(56) References Cited

U.S. PATENT DOCUMENTS 5,581,250 A 12/1996 Khvilivitzky
5,700,074 A 12/1997 Sugimoto et al.
5,785,281 A 7/1998 Peter et al.
5,806,938 A 9/1998 Stumpe et al.
5,983,161 A 11/1999 Lemelson et al.
6,315,513 B1 11/2001 Harukawa et al.
6,405,132 B1 6/2002 Breed et al.
6,463,360 B1 10/2002 Terada et al.
7,693,757 B2 4/2010 Zimmerman
8,190,295 B1 5/2012 Garretson et al.
8,634,981 B1 1/2014 Hyde et al.
8,694,193 B2 4/2014 Mkel et al.
9,102,406 B2 8/2015 Stark et al.
9,114,440 B1 8/2015 Colucci et al.
9,141,109 B1 9/2015 Kamata
9,187,088 B1 11/2015 Ferguson et al.
9,280,153 B1 3/2016 Palamarchuk et al.
9,351,569 B1 5/2016 Lucey et al.
9,358,975 B1 6/2016 Watts
9,383,753 B1 7/2016 Templeton et al.
9,442,487 B1 9/2016 Ferguson et al.
9,465,388 B1 10/2016 Fairfield et al.
9,486,917 B2 11/2016 Reid et al.
9,487,356 B1 11/2016 Aggarwal
9,632,502 B1 4/2017 Levinson et al.
9,671,791 B1 6/2017 Paczan
9,733,646 B1 8/2017 Nusser et al.
9,779,314 B1 10/2017 Wendel et al.
9,896,030 B2 2/2018 Sugimoto
9,928,749 B2 3/2018 Gil et al.
10,019,008 B2 7/2018 Kong et al.
RE47,108 E 10/2018 Jacobus et al.
10,112,771 B2 10/2018 D'Andrea et al.
10,317,119 B2 6/2019 Zou
10,328,769 B2 6/2019 Ferguson et al.
10,328,942 B2 6/2019 Kelly et al.
10,446,034 B2 10/2019 Akamine et al.
10,577,199 B2 3/2020 Lee et al.
10,909,629 B1 2/2021 Madigan et al.
11,167,964 B2 11/2021 Gariepy et al.
11,225,275 B2 1/2022 Gariepy et al.
11,305,593 B2 4/2022 Coombs
2002/0013651 A1 1/2002 Weiberle et al.
2002/0137489 A1 9/2002 Dutta et al.
2002/0154974 A1 10/2002 Fukuda et al.
2003/0096594 A1 5/2003 Naboulsi
2004/0158355 A1 8/2004 Holmqvist et al.
2004/0204803 A1 10/2004 Matsuda et al.
2005/0023052 A1 2/2005 Beck et al.
2005/0216126 A1 9/2005 Koselka et al.
2007/0106306 A1 5/2007 Bodduluri et al.
2007/0106473 A1 5/2007 Bodin et al.
2007/0294029 A1 12/2007 D'Andrea et al.
2008/0018472 A1 1/2008 Dasilva et al.
2008/0106886 A1 5/2008 Sugimoto et al.
2008/0183599 A1 7/2008 Hill et al.
2009/0012667 A1 1/2009 Matsumoto et al.
2009/0043440 A1 2/2009 Matsukawa et al.
2009/0210109 A1 8/2009 Ravenscroft
2009/0222134 A1 9/2009 Franke et al.
2010/0021272 A1 1/2010 Ward et al.
2010/0030417 A1 2/2010 Fang et al.
2010/0030466 A1 2/2010 Rogers et al.
2010/0049391 A1 2/2010 Nakano
2010/0063680 A1 3/2010 Tolstedt et al.
2010/0106356 A1 4/2010 Trepagnier et al.
2010/0206651 A1 8/2010 Nagasaka
2010/0316470 A1 12/2010 Lert et al.
2011/0015844 A1 1/2011 Perkins et al.
2011/0021310 A1 1/2011 Kresse et al.
2011/0210529 A1 9/2011 Markstaller
2012/0121161 A1* 5/2012 Eade .................... G06F 16/444 901/1
2012/0173018 A1 7/2012 Allen et al.
2012/0197464 A1 8/2012 Lai et al.
2012/0213443 A1* 8/2012 Shin .................... G05D 1/0246 901/1
2012/0296471 A1 11/2012 Inaba et al.
2012/0310466 A1 12/2012 Fairfield et al.
2013/0054129 A1 2/2013 Wong et al.
2013/0054133 A1 2/2013 Lewis et al.
2013/0086215 A1 4/2013 Trotta et al.
2013/0142393 A1 6/2013 Burger et al.
2013/0144480 A1 6/2013 Kobayashi et al.
2013/0197760 A1 8/2013 Castaneda et al.
2013/0226340 A1 8/2013 Buchstab
2013/0231779 A1 9/2013 Purkayastha et al.
2013/0253770 A1 9/2013 Nishikawa et al.
2013/0311075 A1 11/2013 Tran et al.
2014/0040431 A1 2/2014 Rao et al.
2014/0188324 A1 7/2014 Waltz et al.
2014/0214255 A1 7/2014 Dolgov et al.
2014/0244004 A1 8/2014 Scott et al.
2014/0277888 A1 9/2014 Dastoor et al.
2014/0309833 A1 10/2014 Ferguson et al.
2014/0350725 A1 11/2014 Lafary et al.
2014/0365113 A1 12/2014 Mcgavran et al.
2014/0365258 A1 12/2014 Vestal et al.
2015/0032252 A1 1/2015 Galluzzo et al.
2015/0046034 A1 2/2015 Kikuchi
2015/0088310 A1 3/2015 Pinter et al.
2015/0161872 A1 6/2015 Beaulieu et al.
2015/0197009 A1 7/2015 Melikian
2015/0217455 A1 8/2015 Kikkeri et al.
2015/0239442 A1 8/2015 Yamakado et al.
2015/0248131 A1 9/2015 Fairfield et al.
2015/0251658 A1 9/2015 Kato
2015/0266487 A1 9/2015 Kato
2015/0269860 A1 9/2015 Shaw et al.
2015/0291210 A1 10/2015 Kageyama
2015/0309485 A1 10/2015 Nishi
2015/0343638 A1 12/2015 Mattern et al.
2015/0352721 A1 12/2015 Wicks et al.
2016/0001775 A1 1/2016 Wilhelm et al.
2016/0059851 A1 3/2016 Klier et al.
2016/0068267 A1 3/2016 Liu et al.
2016/0086494 A1 3/2016 Anandayuvaraj et al.
2016/0093210 A1 3/2016 Bonhomme
2016/0101940 A1 4/2016 Grinnell et al.
2016/0129592 A1* 5/2016 Saboo .................... B25J 5/007 700/248
2016/0193999 A1 7/2016 Sasabuchi
2016/0246301 A1 8/2016 Kazama et al.
2016/0250930 A1 9/2016 Collins et al.
2016/0271800 A1 9/2016 Stubbs et al.
2016/0304198 A1 10/2016 Jourdan
2016/0318445 A1 11/2016 Sugimoto
2016/0327951 A1 11/2016 Walton et al.

(56) References Cited

U.S. PATENT DOCUMENTS

| | | | | |
|---|---|---|---|---|
| 2017/0036771 | A1 | 2/2017 | Woodman et al. | |
| 2017/0039765 | A1 | 2/2017 | Zhou et al. | |
| 2017/0076616 | A1 | 3/2017 | Kanade et al. | |
| 2017/0100837 | A1 | 4/2017 | Zevenbergen et al. | |
| 2017/0102241 | A1 | 4/2017 | Paduano et al. | |
| 2017/0113352 | A1 | 4/2017 | Lutz et al. | |
| 2017/0158178 | A1 | 6/2017 | Kerber et al. | |
| 2017/0168488 | A1 | 6/2017 | Wierzynski et al. | |
| 2017/0188510 | A1 | 7/2017 | Einecke et al. | |
| 2017/0253241 | A1 | 9/2017 | Filev et al. | |
| 2017/0308096 | A1 | 10/2017 | Nusser et al. | |
| 2017/0341236 | A1 | 11/2017 | Forman et al. | |
| 2017/0351261 | A1 | 12/2017 | Levinson et al. | |
| 2017/0355360 | A1 | 12/2017 | Reed et al. | |
| 2018/0001474 | A1 | 1/2018 | Sinyavskiy et al. | |
| 2018/0009000 | A1 | 1/2018 | Shang et al. | |
| 2018/0012490 | A1 | 1/2018 | Jodorkovsky et al. | |
| 2018/0060765 | A1 | 3/2018 | Hance et al. | |
| 2018/0072431 | A1 | 3/2018 | Sahu et al. | |
| 2018/0086575 | A1 | 3/2018 | Mccarthy et al. | |
| 2018/0162349 | A1 | 6/2018 | Chang et al. | |
| 2018/0190046 | A1 | 7/2018 | Levinson et al. | |
| 2018/0211536 | A1 | 7/2018 | Akamine et al. | |
| 2018/0264648 | A1 | 9/2018 | Kim et al. | |
| 2018/0264950 | A1 | 9/2018 | Yokoyama et al. | |
| 2018/0297585 | A1 | 10/2018 | Lian et al. | |
| 2018/0305125 | A1 | 10/2018 | Guo et al. | |
| 2018/0307941 | A1* | 10/2018 | Holz | G06V 30/1988 |
| 2018/0339701 | A1 | 11/2018 | Kwon | |
| 2018/0362270 | A1 | 12/2018 | Clucas et al. | |
| 2019/0079537 | A1 | 3/2019 | Yoshida et al. | |
| 2019/0092347 | A1 | 3/2019 | Kim | |
| 2019/0120951 | A1 | 4/2019 | Fischer | |
| 2019/0129425 | A1 | 5/2019 | Drexler et al. | |
| 2019/0202465 | A1 | 7/2019 | Kato et al. | |
| 2019/0294167 | A1 | 9/2019 | Kutila et al. | |
| 2019/0344796 | A1 | 11/2019 | Lian et al. | |
| 2020/0047343 | A1 | 2/2020 | Bal et al. | |
| 2020/0103915 | A1* | 4/2020 | Holz | G05D 1/0088 |
| 2020/0206928 | A1 | 7/2020 | Denenberg et al. | |
| 2020/0239242 | A1 | 7/2020 | Hoofard et al. | |
| 2020/0249032 | A1* | 8/2020 | Lee | G09B 29/006 |
| 2020/0284601 | A1 | 9/2020 | Myers et al. | |
| 2021/0142667 | A1* | 5/2021 | Choi | G08G 1/0969 |
| 2021/0232153 | A1 | 7/2021 | Inoue | |
| 2022/0005291 | A1 | 1/2022 | Konrardy et al. | |
| 2022/0024047 | A1 | 1/2022 | Bouchard et al. | |
| 2022/0074762 | A1* | 3/2022 | Artes | B25J 9/1664 |
| 2022/0258614 | A1 | 8/2022 | Matsuki et al. | |
| 2022/0308204 | A1 | 9/2022 | Zaidi | |
| 2022/0341906 | A1 | 10/2022 | Lam et al. | |
| 2022/0355495 | A1 | 11/2022 | Rembisz et al. | |
| 2022/0365533 | A1 | 11/2022 | Drexler et al. | |

FOREIGN PATENT DOCUMENTS

| | | | |
|---|---|---|---|
| DE | 112018006030 | T5 | 9/2020 |
| EP | 2385435 | A1 | 11/2011 |
| JP | 2009031884 | A | 2/2009 |
| JP | 2009123045 | A | 6/2009 |
| WO | 2011146259 | A2 | 11/2011 |
| WO | 2015008380 | A1 | 1/2015 |

OTHER PUBLICATIONS

Hasan et al., "An Autonomous Robot for Intelligent Security Systems", Aug. 2018, 9th IEEE Control and System Graduate Research Colloquium (ICSGRC 2018). (Year: 2018).

http://www.digitalglobe.com/downloaded on May 6, 2014 (3 pages).

Shneier et al., "Literature Review of Mobile Robots for Manufacturing", May 2015, NIST. (Year: 2015).

Takahashi et al., "Developing a mobile robot for transport applications in the hospital domain", Mar. 2010, Robotics and Autonomous Systems 58 (2010). Year: 2010).

Wikipedia Vehicular Automation, https://web.archive.org/web/20140402022211/https://en.wikipedia.org/wiki/.

Xiao et al., Pallet recognition and localization using an RGB-D camera, Sep. 13, 2017, International Journal of Advanced Robotic Systems, (Year: 2017).

* cited by examiner

SYSTEMS AND METHODS FOR OPERATING ONE OR MORE SELF-DRIVING VEHICLES

CROSS-REFERENCE TO RELATED PATENT APPLICATION

This application is a continuation of U.S. patent application Ser. No. 17/470,087, filed on Sep. 9, 2021, which claims priority from U.S. Provisional Patent Application No. 63/076,661, filed on Sep. 10, 2020. The entire contents of U.S. patent application Ser. No. 17/470,087 and U.S. Provisional Patent Application No. 63/076,661 is herein incorporated by reference for all purposes.

FIELD

The described embodiments relate generally to self-driving vehicles, and in particular systems and methods of operating one or more self-driving vehicles.

INTRODUCTION

The following paragraph is not an admission that anything discussed therein is prior art or part of the knowledge of persons skilled in the art.

Self-driving vehicles are increasingly employed in various settings, including industrial settings such as warehouse facilities. In many cases, self-driving vehicles navigate within their environment to perform tasks, including stopping to drop-off or pick-up items. In at least some cases, the self-driving vehicles navigate their environment by following guiding infrastructure. In other cases, the self-driving vehicles navigate with reference to an electronic map of the operating environment. In the course of navigating, the self-driving vehicles may be required to avoid collisions with obstacles (e.g., objects or pedestrians) located along the travelling path of the vehicle.

SUMMARY

The various embodiments described herein generally relate to systems and methods for operating one or more self-driving vehicles.

In accordance with one broad aspect, a method for navigating a self-driving vehicle is disclosed. The vehicle includes a vehicle processor. The method involves operating the vehicle processor to: control the vehicle to navigate an operating environment in an initial vehicle navigation mode; monitor for one or more trigger conditions indicating a possible change for the vehicle navigation mode; detect a trigger condition; determine a prospective vehicle navigation mode associated with the detected trigger condition; determine whether to change from the initial vehicle navigation mode to the prospective vehicle navigation mode; and in response to determining to change from the initial vehicle navigation mode to the prospective vehicle navigation mode, adjust one or more vehicle attributes corresponding to the prospective vehicle navigation mode, otherwise continue to operate the vehicle in the initial vehicle navigation mode.

In some embodiments, the prospective vehicle navigation mode can include a fixed path mode in which the vehicle follows guiding infrastructure installed in the operating environment.

In some embodiments, the vehicle can further include at least one detection sensor for monitoring objects surrounding the vehicle, and adjusting one or more vehicle attributes can involve decreasing a detection range of the at least one detection sensor.

In some embodiments, adjusting one or more vehicle attributes can involve controlling a vehicle drive system to increase a travelling speed of the vehicle.

In some embodiments, in the fixed path mode of operation, the vehicle processor is operable to: detect, via at least one vehicle sensor coupled to the vehicle processor, a termination point of the guiding infrastructure; and in response to detecting the termination point, perform at least one of an emergency stop, a controlled stop, or changing to the prospective vehicle navigation mode.

In some embodiments, a trigger condition associated with the fixed path mode can include detecting guiding infrastructure in proximity of the vehicle.

In some embodiments, a trigger condition associated with the fixed path mode can include receiving, via a vehicle communication interface coupled to the vehicle processor, a command to follow guiding infrastructure from a fleet management system.

In some embodiments, the prospective vehicle navigation mode can include a free form mode of operation in which the vehicle follows waypoints defined in an electronic map of the operating environment.

In some embodiments, the prospective vehicle navigation mode can include a free form mode of operation in which the vehicle follows a virtual line path defined in an electronic map of the operating environment.

In some embodiments, a trigger condition of the one or more trigger conditions can include detecting, via a vehicle sensor coupled to the vehicle processor, an indicator for changing the vehicle navigation mode.

In some embodiments, the indicator can include at least one of a physical marker installed in the operating environment, a frequency signal indicator, or an optical signal.

In some embodiments, the trigger condition can include arriving at a waypoint location defined in an electronic map.

In some embodiments, after detecting the trigger condition, the method can further involve operating the vehicle processor to: determine whether to respond to the detected trigger condition based on satisfaction of a response condition, otherwise ignore the detected trigger condition.

In some embodiments, the response condition can include determining that the prospective vehicle navigation mode is different than the initial vehicle navigation mode.

In some embodiments, the response condition can include determining that the detected trigger condition applies to a vehicle type associated with the self-driving vehicle.

In another broad aspect, a system for navigating a self-driving vehicle is disclosed. The system includes a vehicle processor. The vehicle processor being operable to: control the vehicle to navigate an operating environment in an initial vehicle navigation mode; monitor for one or more trigger conditions indicating a possible change for the vehicle navigation mode; detect a trigger condition; determine a prospective vehicle navigation mode associated with the detected trigger condition; determine whether to change from the initial vehicle navigation mode to the prospective vehicle navigation mode; and in response to determining to change from the initial vehicle navigation mode to the prospective vehicle navigation mode, adjust one or more vehicle attributes corresponding to the prospective vehicle navigation mode, otherwise continue to operate the vehicle in the initial vehicle navigation mode.

In some embodiments, the prospective vehicle navigation mode can include a fixed path mode in which the vehicle follows guiding infrastructure installed in the operating environment.

In some embodiments, the vehicle can further include at least one detection sensor for monitoring objects surrounding the vehicle, and adjusting one or more vehicle attributes can involve decreasing a detection range of the at least one detection sensor.

In some embodiments, adjusting one or more vehicle attributes can involve controlling a vehicle drive system to increase a travelling speed of the vehicle.

In some embodiments, in the fixed path mode of operation, the vehicle processor is further operable to: detect, via at least one vehicle sensor coupled to the vehicle processor, a termination point of the guiding infrastructure; and in response to detecting the termination point, perform at least one of an emergency stop, a controlled stop, or changing to the prospective vehicle navigation mode.

In some embodiments, a trigger condition associated with the fixed path mode can include detecting guiding infrastructure in proximity of the vehicle.

In some embodiments, a trigger condition associated with the fixed path mode can include receiving, via a vehicle communication interface coupled to the vehicle processor, a command to follow guiding infrastructure from a fleet-management system.

In some embodiments, the prospective vehicle navigation mode can include a free form mode of operation in which the vehicle follows waypoints defined in an electronic map of the operating environment.

In some embodiments, the prospective vehicle navigation mode is a free form mode of operation in which the vehicle follows a virtual line path defined in an electronic map of the operating environment.

In some embodiments, a trigger condition of the one or more trigger conditions can include detecting, via a vehicle sensor coupled to the vehicle processor, an indicator for changing the vehicle navigation mode.

In some embodiments, the indicator can include at least one of a physical marker installed in the operating environment, a frequency signal indicator, or an optical signal.

In some embodiments, the trigger condition can include arriving at a waypoint location defined in an electronic map.

In some embodiments, after detecting the trigger condition, the vehicle processor is further operable to: determine whether to respond to the detected trigger condition based on satisfaction of a response condition, otherwise ignore the detected trigger condition.

In some embodiments, the response condition can include determining that the prospective vehicle navigation mode is different than the initial vehicle navigation mode.

In some embodiments, the response condition can include determining that the detected trigger condition applies to a vehicle type associated with the self-driving vehicle.

In another broad aspect, a method for navigating a self-driving vehicle is disclosed. The vehicle includes a vehicle processor in communication with at least one vehicle sensor. The method involves operating the vehicle processor to: control the vehicle, using input data from the at least one vehicle sensor, to follow guiding infrastructure; detect, using the at least one vehicle sensor, a proximity indicator indicating proximity of the vehicle to a waypoint; determine if a trigger condition is satisfied for responding to the detected proximity indicator; in response to determining the trigger condition is satisfied, assess a feature of the proximity indicator to determine a distance between a current position of the vehicle and the waypoint; and adjust at least one vehicle operating attribute based on the determined distance.

In some embodiments, the proximity indicator can include a line segment spaced from the guiding infrastructure.

In some embodiments, the line segment is located proximal the waypoint and converges toward the guiding infrastructure toward the waypoint.

In some embodiments, operating the vehicle processor to assess the feature of the proximity indicator can involve operating the vehicle processor to measure a lateral spacing between the line segment and the guiding infrastructure.

In some embodiments, the feature of the proximity indicator can include at least one of a thickness of the line segment or a color of the line segment.

In some embodiments, the proximity indicator can include an emitted signal.

In some embodiments, the feature assessed is at least one of a signal strength or a signal frequency.

In some embodiments, the signal is at least one of a frequency signal or an optical light signal.

In some embodiments, the trigger condition can include determining that the waypoint corresponds to the location of a vehicle task requiring execution.

In some embodiments, operating the vehicle processor to adjust the at least one vehicle attribute can involve operating the vehicle processor to control a vehicle drive system to reduce a vehicle travelling speed.

In some embodiments, the at least one vehicle sensor can include a first vehicle sensor and a second vehicle sensor, the first vehicle sensor being used to follow the guiding infrastructure, and the second vehicle sensor being used to detect the proximity indicator.

In some embodiments, the guiding infrastructure can include magnetic tape.

In another broad aspect, a system for navigating a self-driving vehicle is disclosed. The system includes a vehicle processor in communication with at least one vehicle sensor. The vehicle processor being operable to: control the vehicle, using input data from the at least one vehicle sensor, to follow guiding infrastructure; detect, using the at least one vehicle sensor, a proximity indicator indicating proximity of the vehicle to a waypoint; determine if a trigger condition is satisfied for responding to the detected proximity indicator; in response to determining the trigger condition is satisfied, assess a feature of the proximity indicator to determine a distance between a current position of the vehicle and the waypoint; and adjust at least one vehicle attribute based on the determined distance.

In some embodiments, the proximity indicator can include a line segment spaced from the guiding infrastructure.

In some embodiments, the line segment is located proximal the waypoint and converges toward the guiding infrastructure toward the waypoint.

In some embodiments, the vehicle processor being operable to assess the feature of the proximity indicator can include the vehicle processor being operable to measure a lateral spacing between the line segment and the guiding infrastructure.

In some embodiments, the feature of the proximity indicator can include at least one of a thickness of the line segment or a color of the line segment.

In some embodiments, the proximity indicator can include an emitted signal.

In some embodiments, the feature assessed is at least one of a signal strength or a signal frequency.

In some embodiments, the signal is at least one of a frequency signal or an optical light signal.

In some embodiments, the trigger condition can include determining that the waypoint corresponds to the location of a vehicle task requiring execution.

In some embodiments, the vehicle processor being operable to adjust the at least one vehicle attribute can include the vehicle processor being operable to control a vehicle drive system to reduce a vehicle travelling speed.

In some embodiments, the at least one vehicle sensor can include a first vehicle sensor and a second vehicle sensor, the first vehicle sensor being used to follow the guiding infrastructure, and the second vehicle sensor being used to detect the proximity indicator.

In some embodiments, the guiding infrastructure can include magnetic tape.

In another broad aspect, a method for updating an electronic map of a facility using a self-driving vehicle is disclosed. The vehicle includes a vehicle processor and at least one vehicle sensor. The method involves operating the vehicle processor to: operate a vehicle drive system to navigate the vehicle inside of the facility; receive sensor data, using the at least one vehicle sensor, in respect of a presence or an absence of guiding infrastructure in the facility; compare the received sensor data to information stored in the electronic map; determine a discrepancy between the received sensor data and the electronic map in respect of the guiding infrastructure; and update the electronic map based on the determined discrepancy.

In some embodiments, the method can further involve operating the vehicle processor to: determine a location of the vehicle relative to the electronic map; and update the electronic map at the location.

In some embodiments, the at least one vehicle sensor can include at least one of a light detection and ranging (LiDAR) sensor, a visual sensor, or a magnetic tape sensor.

In some embodiments, operating the vehicle processor to determine the discrepancy can involve operating the vehicle processor to determine that the electronic map does not include a representation of guiding infrastructure detected by the vehicle at the location, and wherein operating the vehicle processor to update the electronic map can involve operating the vehicle processor to add a representation of the guiding infrastructure into the electronic map at the location.

In some embodiments, adding the representation into the electronic map, can involve adding one or more graph nodes into the electronic map corresponding to the detected guiding infrastructure.

In some embodiments, each graph node can include data in respect of one or more of: a pose orientation of the vehicle at the location; a time-stamp indicating when the discrepancy was detected; or one or more sensor measurements by the at least one vehicle sensor.

In some embodiments, the electronic map is stored on a vehicle memory.

In some embodiments, the method can further involve transmitting an updated electronic map to the fleet management system.

In another broad aspect, a system for updating an electronic map of a facility using a self-driving vehicle is disclosed. The system includes a vehicle processor and at least one vehicle sensor. The vehicle processor being operable to: operate a vehicle drive system to navigate the vehicle inside of the facility; receive sensor data, using the at least one vehicle sensor, in respect of a presence or an absence of guiding infrastructure in the facility; compare the received sensor data to information stored in the electronic map; determine a discrepancy between the received sensor data and the electronic map in respect of the guiding infrastructure; and update the electronic map based on the determined discrepancy.

In some embodiments, the vehicle processor is further operable to: determine a location of the vehicle relative to the electronic map; and update the electronic map at the location.

In some embodiments, the at least one vehicle sensor can include at least one of a light detection and ranging (LiDAR) sensor, a visual sensor, or a magnetic tape sensor.

In some embodiments, the vehicle processor being operable to determine the discrepancy can include the vehicle processor being operable to determine that the electronic map does not include a representation of guiding infrastructure detected by the vehicle at the location, and wherein the vehicle processor being operable to update the electronic map can include the vehicle processor being operable to add a representation of the guiding infrastructure into the electronic map at the location.

In some embodiments, adding the representation into the electronic map, can involve adding one or more graph nodes into the electronic map corresponding to the detected guiding infrastructure.

In some embodiments, each graph node can include data in respect of one or more of: a pose orientation of the vehicle at the location; a time-stamp indicating when the discrepancy was detected; or one or more sensor measurements by the at least one vehicle sensor.

In some embodiments, the electronic map is stored on a vehicle memory.

In some embodiments, the vehicle processor being further operable to transmit an updated electronic map to the fleet management system.

In another broad aspect, a method for operating a self-driving vehicle is disclosed. The vehicle includes a vehicle processor. The method can involve operating the vehicle processor to: determine a first location of the vehicle using a first vehicle localization method; determine a second location of the vehicle using a second vehicle localization method; based on the first and second locations, identify a vehicle location; determine if the vehicle location is within a pre-defined zone; and based on the determination, adjust at least one vehicle operating attribute to correspond to a corresponding zone-specific vehicle attribute.

In some embodiments, the pre-defined zone is a pedestrian-exclusion zone, and the corresponding zone-specific attribute can include one or more of an increased detection range and an increased vehicle travelling speed.

In some embodiments, the pre-defined zone is a high traffic pedestrian zone, and the at least one zone-specific attribute can include one or more of an increased detection range and a decreased vehicle travelling speed.

In some embodiments, the pre-defined zones are defined in an electronic map accessible to the vehicle processor.

In some embodiments, a storage medium is coupled to the vehicle processor, the storage medium storing a safety performance level associated with the first vehicle localization method, and the method further can involve operating the vehicle processor to: prior to determining the second location, determine that the safety performance level is less than a safety performance level threshold.

In some embodiments, the method can further involve operating the vehicle processor to: prior to determining the second location, determine that the first location is within the pre-defined zone; and determine the safety performance level threshold associated with the pre-defined zone.

In some embodiments, a storage medium is coupled to the vehicle processor, the storage medium storing a first safety performance level associated with the first vehicle localization method and a second safety performance level associated with the second vehicle localization method, and the method can further involve operating the vehicle processor to: determine whether the first location is different than the second location; in response to determining that the first location is different than the second location, determine that at least one of the first and second safety performance levels exceeds the safety performance level threshold; and select the vehicle location generated by the localization method having the safety performance level exceeding the safety performance level threshold.

In some embodiments, the vehicle can further include at least one first sensor and at least one second sensor, each being coupled to the vehicle processor, and the method can further involve operating the vehicle processor to: determine the first location using the at least one first sensor; and determine the second location using the at least one second sensor.

In some embodiments, the vehicle processor can include a first vehicle processor being coupled to the at least one first sensor, and a second vehicle processor being coupled to the at least one second sensor, and the method can further involve operating the first vehicle processor to: based on first sensor data generated by the at least one first sensor, determine the first location; and based on second sensor data generated by the at least one second sensor, determine the second location.

In some embodiments, the method can further involve operating the vehicle processor to: determine whether the vehicle location is within a pre-defined zone; and in response to the determining that the vehicle location is not within a pre-defined zone, continue operating the vehicle using initial vehicle operating attributes.

In another broad aspect, a system for operating a self-driving vehicle is disclosed. The vehicle includes a vehicle processor being operable to: determine a first location of the vehicle using a first vehicle localization method; determine a second location of the vehicle using a second vehicle localization method; based on the first and second locations, identify a vehicle location; determine if the vehicle location is within a pre-defined zone; and based on the determination, adjust at least one vehicle operating attribute to correspond to a corresponding zone-specific vehicle attribute.

In some embodiments, the pre-defined zone is a pedestrian-exclusion zone, and the at least one zone-specific attribute can include one or more of an increased detection range and an increased vehicle travelling speed.

In some embodiments, the pre-defined zone is a high traffic pedestrian zone, and the at least one zone-specific attribute can include one or more of an increased detection range and a decreased vehicle travelling speed In some embodiments, the pre-defined zones are defined in an electronic map accessible to the vehicle processor.

In some embodiments, the system can further include a storage medium coupled to the vehicle processor, the storage medium storing a safety performance level associated with the first vehicle localization method, and the vehicle processor being further operable to: prior to determining the second location, determine that the safety performance level is less than a safety performance level threshold.

In some embodiments, prior to determining the second location, the vehicle processor being further operable to: determine that the first location is within the pre-defined zone; and determine the safety performance level threshold associated with the pre-defined zone.

In some embodiments, the system can further include a storage medium coupled to the vehicle processor, the storage medium storing a first safety performance level associated with the first vehicle localization method and a second safety performance level associated with the second vehicle localization method, and the vehicle processor being further operable to: determine that the first location is different than the second location; in response to the determination, determine that at least one of the first and second safety performance levels exceeds the safety performance level threshold; and selecting the vehicle location generated by the localization method having the safety performance level exceeding the safety performance level threshold.

In some embodiments, the vehicle can further include at least one first sensor and at least one second sensor, wherein the first localization method uses the at least one first sensor to determine the first location, and the second localization method the at least one second sensor to determine the second location.

In some embodiments, the vehicle processor can include a first vehicle processor and a second vehicle processor, the first vehicle processor being coupled to the at least one first sensor and operable to process first sensor data generated by the at least one first sensor to determine the first location, and the second vehicle processor being coupled to the at least one second sensor and operable to process second sensor data generated by the at least one second sensor to determine the second location.

In some embodiments, the vehicle processor is further operable to: determine whether the vehicle location is within a pre-defined zone; and in response to the determining that the vehicle location is not within a pre-defined zone, continue operating the vehicle with an initial vehicle operating attributes.

In another broad aspect, a method for operating a self-driving vehicle is disclosed. The vehicle includes a vehicle processor. The method involves operating the vehicle processor to: control the vehicle to navigate an operating environment; monitor for one or more proximity indicia indicating a proximity of the vehicle to at least one of a pedestrian or a surrounding object; detect the proximity indicia; determine if a trigger condition is satisfied for responding to the proximity indicia; and in response to determining that the trigger condition is satisfied, adjust at least one vehicle operating attribute.

In some embodiments, the self-driving vehicle processor can include at least one sensor coupled to the vehicle processor.

In some embodiments, monitoring for one or more proximity indicia can involve operating the vehicle processor to: detect, based on sensor data generated by the at least one sensor, semantic cues in the operating environment surrounding the vehicle.

In some embodiments, the semantic cues can include one or more audio cues, visual cues and optical cues.

In some embodiments, monitoring for one or more proximity indicia can involve operating the vehicle processor to: detect, based on sensor data generated by the at least one sensor, an indicator which indicates a proximity to at least one of a pedestrian or surrounding object.

In some embodiments, the indicators can include at least one of radio-frequency identification (RFID) tags, quick response (QR) codes, reflective tags, light-emitting indicators and frequency-emitting indicators.

In some embodiments, determining if the trigger condition is satisfied can involve operating the vehicle processor to: detect, based on sensor data generated by the at least one sensor, a separation distance between the vehicle and the at least one of a pedestrian or a surrounding object identified by the proximity indicia; and determine that the separation distance is less than a pre-determined distance threshold.

In some embodiments, determining if the trigger condition is satisfied can involve operating the vehicle processor to: detect, based on sensor data generated by the at least one sensor, a vehicle travelling speed; and determine that the vehicle travelling speed is greater than a pre-determined vehicle travelling speed threshold.

In some embodiments, determining if the trigger condition is satisfied can involve operating the vehicle processor to: determine that a vehicle travelling path intersects the at least one of a pedestrian or a surrounding object identified by the proximity indicia.

In some embodiments, the at least one adjusted vehicle operating attribute can include at least one of a vehicle travelling speed and a vehicle detection range.

In another broad aspect, a system for operating a self-driving vehicle is provided. The system including a vehicle processor being operated to: control the vehicle to navigate an operating environment; monitor for one or more proximity indicia indicating a proximity of the vehicle to at least one of a pedestrian or a surrounding object; detect the proximity indicia; determine if a trigger condition is satisfied for responding to the proximity indicia; and in response to determining that the trigger condition is satisfied, adjust at least one vehicle operating attribute.

In some embodiments, the system can further include at least one sensor coupled to the vehicle processor.

In some embodiments, monitoring for one or more proximity indicia can include the vehicle processor being further operable to: detect, based on sensor data generated by the at least one sensor, semantic cues in the operating environment surrounding the vehicle.

In some embodiments, the semantic cues can include one or more of audio cues, visual cues, and optical cues.

In some embodiments, monitoring for one or more proximity indicia can include the vehicle processor being further operable to: detect, based on sensor data generated by the at least one sensor, an indicator that indicates a proximity to at least one of a pedestrian or a surrounding object.

In some embodiments, the indicators can include at least one of radio-frequency identification (RFID) tags, quick response (QR) codes, reflective tags, light-emitting indicators and frequency-emitting indicators.

In some embodiments, determining if the trigger condition is satisfied can include the vehicle processor being further operable to: detect, based on sensor data generated by the at least one sensor, a separation distance between the vehicle and the at least one of a pedestrian or a surrounding object identified by the proximity indicia; and determine that the separation distance is less than a pre-determined distance threshold.

In some embodiments, determining if the trigger condition is satisfied can include the vehicle processor being further operable to: detect, based on sensor data generated by the at least one sensor, a vehicle travelling speed; and determine that the vehicle travelling speed is greater than a pre-determined vehicle travelling speed threshold.

In some embodiments, determining if the trigger condition is satisfied can include the vehicle processor being further operable to: determine that a vehicle travelling path intersects the at least one of a pedestrian or a surrounding object identified by the proximity indicia.

In some embodiments, the at least one adjusted vehicle operating attribute can include at least one of a vehicle travelling speed and a vehicle detection range.

Other aspects and features will become apparent, to those ordinarily skilled in the art, upon review of the following description of some exemplary embodiments.

BRIEF DESCRIPTION OF THE DRAWINGS

Several embodiments will now be described in detail with reference to the drawings, in which.

Figure 1:
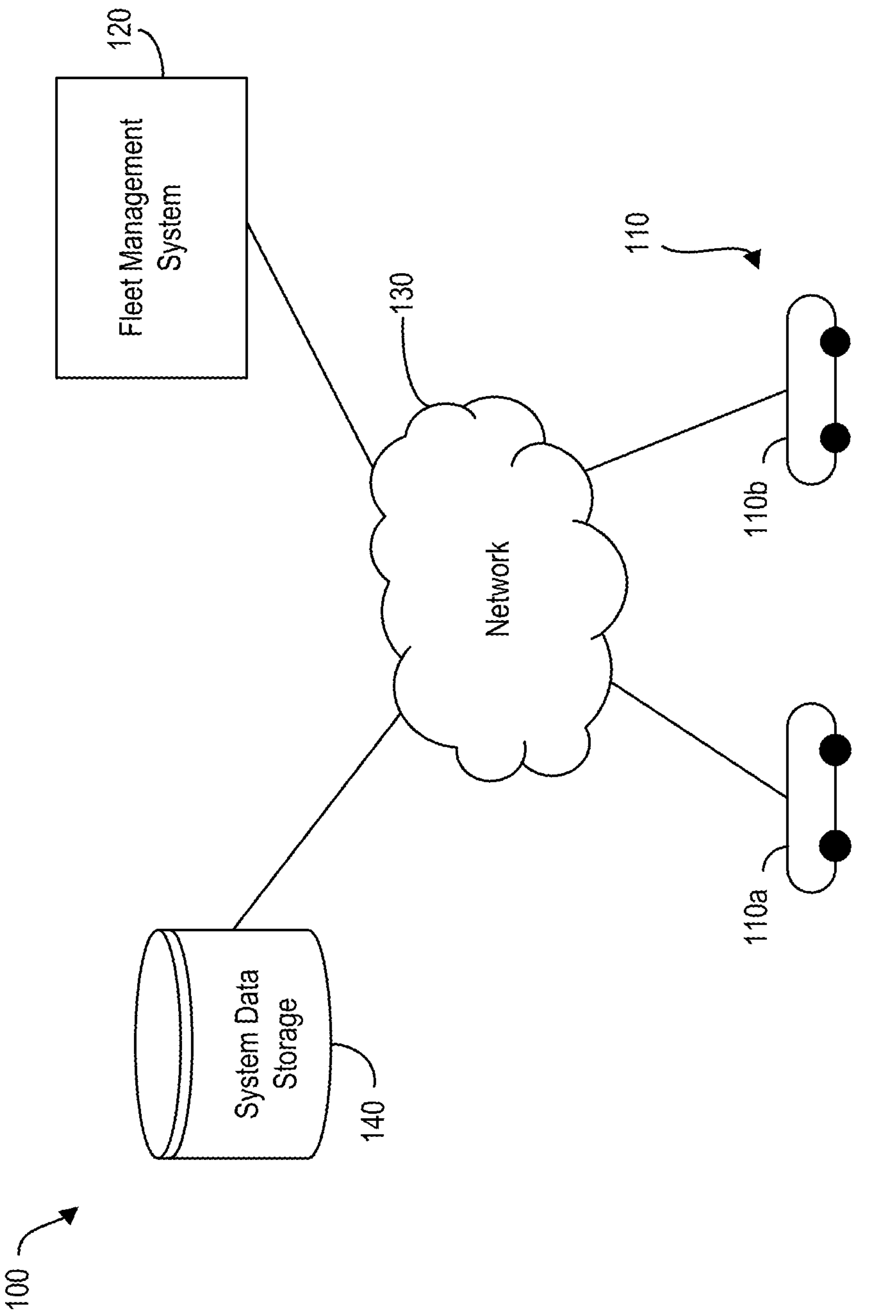
FIG. 1 is a block diagram illustrating example self-driving vehicles in communication with example components, according to an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

Self-driving vehicles may navigate within their environment to perform various tasks. The navigation may be performed by following guiding infrastructure installed in the environment, or otherwise with reference to an electronic map of the operating environment. In the course of navigating, the self-driving vehicle may be required to avoid obstacles (e.g., objects or pedestrians) along the vehicle travelling path.

Referring now to FIG. 1, which shows a block diagram 100 illustrating example self-driving vehicles 110 in communication with example components. As shown in FIG. 1, the self-driving vehicles 110 can be in communication with a fleet management system 120 and a system data storage 140 via a network 130.

The self-driving vehicles 110 in FIG. 1 include example vehicles 110*a*, 110*b* for illustrative purposes. Fewer or more self-driving vehicles 110 can be included. In some example cases, the self-driving vehicles 110 can operate to pick up, transport, and/or drop off materials at various locations.

The network 130 may be any network capable of carrying data, including the Internet, Ethernet, old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between the self-driving vehicles 110, the fleet management system 120 and/or the system data storage 140. In some embodiments, the self-driving vehicles 110 can communicate with each other via the network 130. For example, vehicle 110*a* can communicate with vehicle 110*b* via the network 130. In some embodiments, vehicle 110*a* can communicate with vehicle 110*b* directly via onboard communication components.

The system data storage 140 can store data related to the self-driving vehicles 110 and/or the fleet management system 120. The system data storage 140 can include RAM, ROM, one or more hard drives, one or more flash drives or some other suitable data storage elements such as disk drives, etc.

The system data storage 140 can also store electronic maps related to the operating environment of the self-driving vehicles 110. The electronic maps located on system data storage 140 can be accessible for download, via the network 130, by the fleet management system 120 and the self-driving vehicles 110. In some embodiments, the electronic map can be generated and updated by the fleet management system 120 based on information received from the self-driving vehicles 110. In some embodiments, the system data storage 140 can be located at the fleet management system 120.

The illustrated FIG. 1 includes the fleet management system 120. The fleet management system 120 can operate to direct and/or monitor the operation of the self-driving vehicles 110. In some embodiments, the self-driving vehicles 110 can operate within a decentralized network-without, or at least with minimal, involvement of the fleet management system 120.

The fleet management system 120 can include a processor, a data storage, and a communication component (not shown). For example, the fleet management system 120 can be any computing device, such as, but not limited to, an electronic tablet device, a personal computer, workstation, server, portable computer, mobile device, personal digital assistant, laptop, smart phone, WAP phone, an interactive television, video display terminals, gaming consoles, and portable electronic devices or any combination of these. The components of the fleet management system 120 can be provided over a wide geographic area and connected via the network 130.

The processor of the fleet management system 120 can include any suitable processors, controllers or digital signal processors that can provide sufficient processing power depending on the configuration, purposes and requirements of the fleet management system 120. In some embodiments, the processor can include more than one processor with each processor being configured to perform different dedicated tasks.

The data storage of the fleet management system 120 can include random access memory (RAM), a read-only memory (ROM), an erasable programmable read-only memory (EPROM, EEPROM, or Flash memory), one or more hard drives, one or more flash drives or some other suitable data storage elements such as disk drives, etc. The communication component of the fleet management system 120 can include any interface that enables the fleet management system 120 to communicate with other devices and systems. In some embodiments, the communication component can include at least one of a serial port, a parallel port or a USB port. The communication component may also include at least one of an Internet, Local Area Network (LAN), Ethernet, Firewire, modem or digital subscriber line connection. Various combinations of these elements may be incorporated within the communication component. For example, the communication component may receive input from various input devices, such as a mouse, a keyboard, a touch screen, a thumbwheel, a track-pad, a track-ball, a card-reader, voice recognition software and the like depending on the requirements and implementation of the fleet management system 120.

In some embodiments, the fleet management system 120 can generate commands for the self-driving vehicles 110. For example, the fleet management system 120 can generate and transmit navigational commands to the self-driving vehicles 110. The navigational commands can direct the self-driving vehicles 110 to navigate to one or more waypoints or destination locations located within the operating environment of the self-driving vehicles 110. For example, the destination locations can correspond to locations where the self-driving vehicles 110 are required to pick up or drop off loads.

In some embodiments, the fleet management system 120 can transmit only the destination locations to the self-driving vehicles 110 and the self-driving vehicles 110 can then navigate themselves to the waypoints or destination locations. The fleet management system 120 can transmit the destination locations in various formats, such as, but not limited to, a set of Global Positioning System (GPS) coordinates, or coordinates defined relative to an electronic map accessible to the self-driving vehicles 110 and the fleet management system 120. The destination locations, in some embodiments, can be identified with respect to known objects or landmarks within the operating environment of the self-driving vehicles 110. For example, the self-driving vehicles 110 can identify the location of the object or landmark on an electronic map, and navigate to the object or landmark.

The fleet management system 120 can also receive data from the self-driving vehicles 110. For example, the self-driving vehicles 110 can transmit operating data about objects identified during its operation that appear inconsistent with the electronic map. The fleet management system 120 can receive the operating data and update the electronic map, as necessary. In the case that the identified object is obstructing the operation of the self-driving vehicles 110, the fleet management system 120 can transmit updated navigation commands to the self-driving vehicles 110 to guide the self-driving vehicles 110 around the object.

Figure 2:
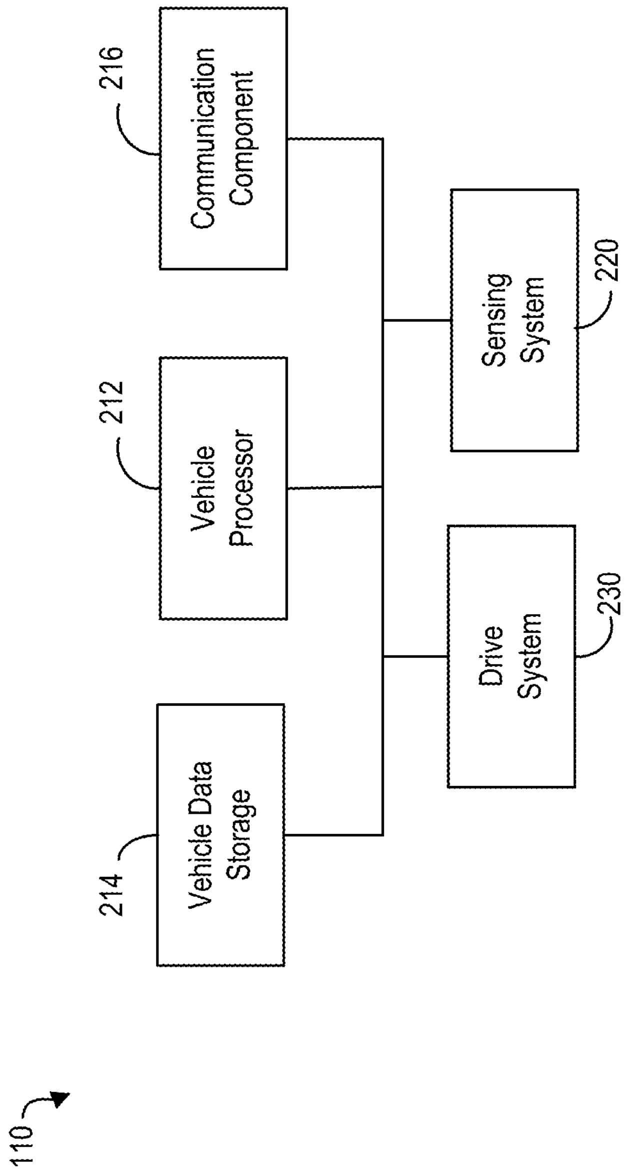
FIG. 2 is a block diagram of example components of an example self-driving vehicle.

Reference is now made to FIG. 2, which illustrates a block diagram 200 of an example self-driving vehicle 110.

The self-driving vehicle 110 can include a vehicle processor 212, a vehicle data storage 214, a communication component 216, a sensing system 220, and a drive system 230. Components 212, 214, 216, 220, and 230 are illustrated separately in FIG. 2, for ease of exposition. In some embodiments, one or more of the components 212, 214, 216, 220, and 230 can be combined into fewer components, or separated into further components. In some embodiments, parts of a component can be combined with another part of another component.

The vehicle processor 212 can include any suitable processor, controller or digital signal processor that can provide sufficient processing power depending on the configuration, purposes and requirements of the self-driving vehicle 110. In some embodiments, the vehicle processor 212 can include more than one processor with each processor being configured to perform different dedicated tasks.

The vehicle processor 212 can operate the vehicle data storage 214, the communication component 216, the sensing system 220, and the drive system 230. For example, the vehicle processor 212 can operate the drive system 230 to navigate to the waypoints or destination location as identified by the fleet management system 120. The operation of the vehicle processor 212 can be based on data collected from the vehicle data storage 214, the communication component 216, the sensing system 220, and/or the drive system 230, in some embodiments.

The vehicle data storage 214 can include can include RAM, ROM, one or more hard drives, one or more flash drives or some other suitable data storage elements such as disk drives, etc. For example, the vehicle data storage 214 can include volatile and non-volatile memory. Non-volatile memory can store computer programs consisting of computer-executable instructions, which can be loaded into the volatile memory for execution by the vehicle processor 212. Operating the vehicle processor 212 to carry out a function can involve executing instructions (e.g., a software program) that can be stored in the vehicle data storage 214 and/or transmitting or receiving inputs and outputs via the communication component 216. The vehicle data storage 214 can also store data input to, or output from, the vehicle processor 212, which can result from the course of executing the computer-executable instructions for example.

In some embodiments, the vehicle data storage 214 can store data related to the operation of the self-driving vehicle 110, such as one or more electronic maps of its operating environment and/or operating parameters. The vehicle data storage 214 can store data tables, data processing algorithms (e.g., image processing algorithms), as well as other data and/or operating instructions which can be used by the vehicle processor 212. The vehicle processor 212 can operate to process data received from the sensing system 220.

The communication component 216 can include any interface that enables the self-driving vehicle 110 to communicate with other components, and external devices and systems. In some embodiments, the communication component 216 can include at least one of a serial port, a parallel port or a USB port. The communication component 216 may also include a wireless transmitter, receiver, or transceiver for communicating with a wireless communications network (e.g. using an IEEE 802.11 protocol or similar). The wireless communications network can include at least one of an Internet, Local Area Network (LAN), Ethernet, Firewire, modem or digital subscriber line connection. Various combinations of these elements may be incorporated within the communication component 216. For example, the communication component 216 may receive input from various input devices, such as a mouse, a keyboard, a touch screen, a thumbwheel, a track-pad, a track-ball, a card-reader, voice recognition software and the like depending on the requirements and implementation of the self-driving vehicle 110. For example, the communication component 216 can receive commands and/or data from the fleet management system 120 and/or another self-driving vehicle (e.g., another self-driving vehicle operating within the operating environment).

The communication component 216 can receive information about obstacles and/or unexpected objects located in the vehicle's operating environment directly from other self-driving vehicles within the same operating environment and/or indirectly via the fleet management system 120. The vehicle processor 212 can update an electronic map stored in the vehicle data storage 214 with this information, for example. The vehicle processor 212 may also transmit, via the communication component 216 for example, information related to obstacles and/or unexpected objects identified in its operating environment to other self-driving vehicles directly or indirectly via the fleet management system 120.

The sensing system 220 can monitor the environment of the self-driving vehicle 110. The sensing system 220 can include one or more sensors for capturing information related to the environment. The information captured by the sensing system 220 can be applied for various purposes, such as localization, navigation, mapping and/or collision avoidance. For example, the sensing system 220 can include optical sensors equipped with depth perception capabilities, infrared (IR) capabilities, or sonar capabilities. The optical sensors can include imaging sensors (e.g., photographic and/or video cameras), and range-finding sensors (e.g., time of flight sensors, Light Detection and Ranging (LiDAR) devices which generate and detect reflections of pulsed laser from objects proximal to the self-driving vehicle 110, etc.). The sensing system 220 can also include navigational sensors, such as ground positioning system (GPS) sensors, as well as sensors that detect guiding infrastructure installed within the operating environment. Example sensors that detect guiding infrastructure can include, but not limited to, magnetic sensors that detect magnetic tape within a facility warehouse, and/or optical sensors that detect visual navigational indicators within the operating environment.

In some embodiments, the sensing system 220 can include one or more sensing processors that receives data collected by the sensors and processes the collected data. The sensing processors can operate independently from the vehicle processor 212. In some other embodiments, the sensing system 220 can receive the data collected by the sensors and transmit the collected data to the vehicle processor 212 for further processing.

The drive system 230 can include the components required for steering and driving the self-driving vehicle 110. For example, the drive system 230 can include the steering component and drive motor.

Figure 3:
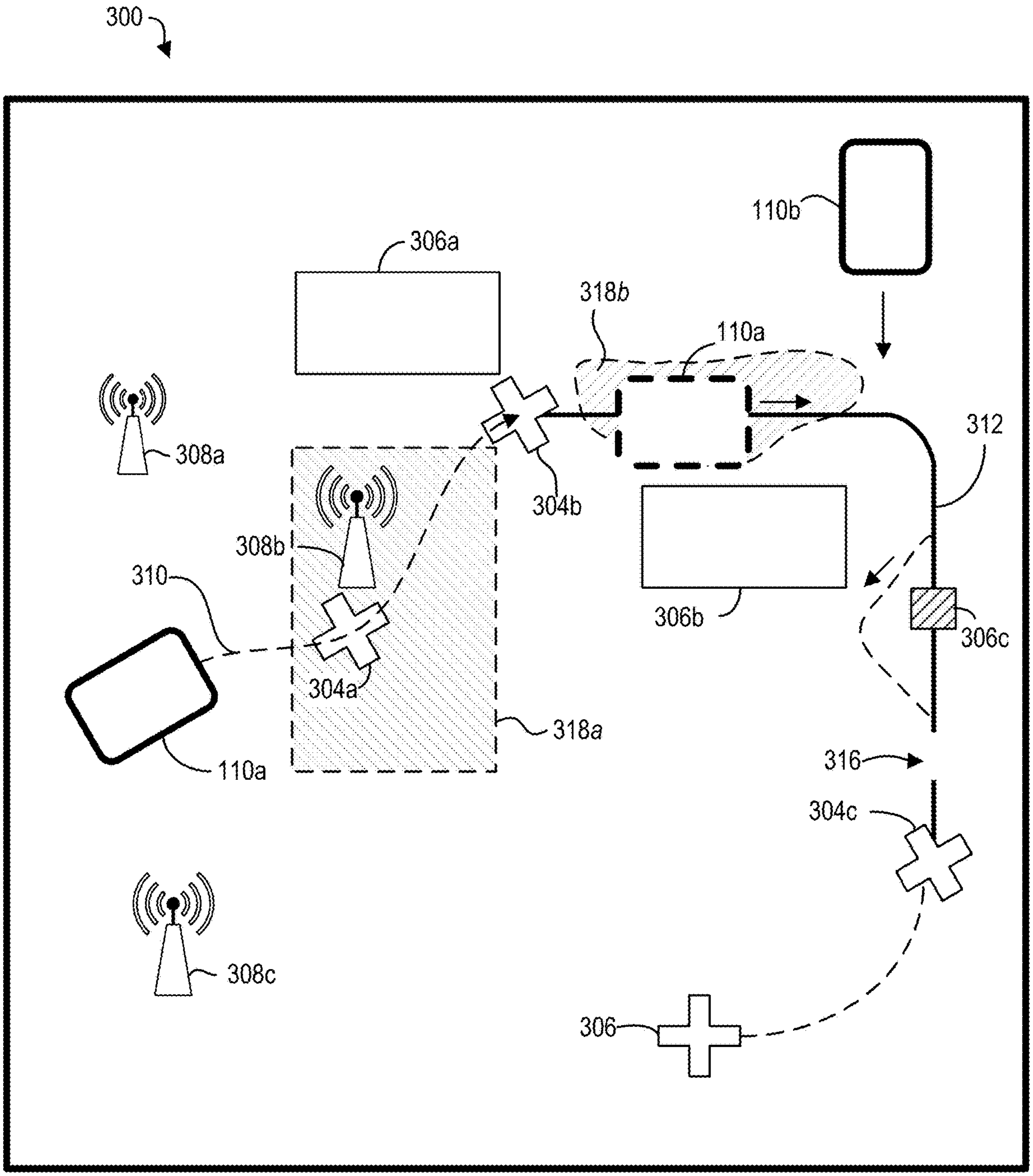
FIG. 3 is a schematic illustration of an example operating environment for self-driving vehicles.

Referring now to FIG. 3, which schematically illustrates an example operating environment 300 for self-driving vehicles.

In the course of completing mission tasks, self-driving vehicles may be required to navigate within their operating environment 300. For instance, in the illustrated example, a self-driving vehicle 110*a* may navigate to a destination location 306 to complete a task (e.g., pick-up or drop-off items). To navigate through the environment 300, the vehicle 110*a* may either follow guiding infrastructure installed in the environment 300 (e.g., guiding infrastructure 312), or otherwise follow virtualized references included in an electronic map of the environment accessible to the vehicle processor 212. The virtualized references may be, for example, one or more virtual waypoints 304*a*, 304*b* and 304*c*, or a virtualized line path 310 defined in the electronic map.

In cases where the vehicle 110*a* is following guiding infrastructure, the guiding infrastructure may include, for example, magnetic or colored tape, embedded wire, reflectors, RFID tags or paint/tape traces. In FIG. 3, magnetic tape 312 is installed in a facility to guide the vehicle path between waypoints 304*b* and 304*c*. The vehicle 110*a* can track and follow the guiding infrastructure using one or more sensors of the vehicle sensing system 220. For example, sensing system 220 can include one or more magnetic sensors to detect the magnetic tape 312. Sensing system 220 can also include one or more optical sensors (e.g., cameras) to detect paint/tape trace, RFID tags, or the like. Based on sensor data generated by the sensing system 220, vehicle processor 212 may control the vehicle drive system 230 to track and follow the guiding infrastructure. In cases where the vehicle 110*a* is navigating using guiding infrastructure, the vehicle 110*a* may be said to navigate in a "fixed path" mode.

In other cases, self-driving vehicle 110*a* may navigate the environment without reference to guiding infrastructure. For example, the self-driving vehicle 110*a* may navigate with reference to an electronic map of the operating environment, which can be accessible to the vehicle processor 212. The electronic map may include features such as a virtual line path (e.g., virtual line path 310 in FIG. 3) and/or virtual waypoints (e.g., waypoints 304*a* and 304*b*) to guide vehicle navigation.

In some cases, the virtual line path and/or waypoints—included in the electronic map—may be generated by the fleet management system 120. The electronic map may then be stored by the fleet management system 120 in data storage 140, and made accessible to the vehicle processor 212 via communication component 216. Otherwise, the electronic map can be transmitted to the vehicle processor 212, via communication component 216. In still other cases, data identifying the virtual line path and/or waypoint co-ordinates (e.g., GPS co-ordinate data) may be transmitted directly to vehicle processor 212, without requiring transmission of the electronic map.

To navigate an environment using virtual line paths and/or waypoints, vehicle processor 212 may determine the vehicle's position within the environment, and may cross-reference the determined position to the location of the virtual line path and/or one or more waypoints in the electronic map. In this manner, the vehicle may track its location within the electronic map, and may follow the virtualized line path and/or waypoints.

In order to determine the vehicle's position for the purpose of cross-referencing, vehicle processor 212 may use any suitable vehicle localization technique. For example, in FIG. 3, one or more beacons 308 may be located in the environment and may have known locations in the electronic map of the operating environment. While three beacons 308*a*, 308*b*, 308*c* are shown in FIG. 3 for illustrative purposes, fewer or more beacons 308 can be included in the operating environment. Each of the beacons 308 may emit signals, which are received by the vehicle sensing system 220. Based on the known locations of the beacons 308, the vehicle may localize its position by triangulating the received signals. In other cases, beacons 308 may be adapted for ultra wide band (UWB) localization techniques. In these cases, a vehicle mounted emitter may emit short pulses to one or more beacons 308, and receive back a pulse reflection. The pulse travel time can be used by vehicle processor 212 to determine the vehicle location.

In other embodiments, localization can occur with reference to indicators positioned in the surrounding environment. The indicators can include objects or markers installed in the environment. For example, the objects or markers may include shelves or other structures 306*a*, 306*b*, guiding infrastructure 312, paint/tape traces, constellations of lights, RFID tags, or other natural features occurring in the environment (e.g., walls, corners, etc.). The indicators may be detected using one or more sensors of the vehicle sensing system 220 (e.g., LiDAR, cameras, etc.). The detected objects may be cross-referenced to the known location of these objects or markers in an electronic map of the environment to localize the vehicle's position.

In cases where the vehicle is not following guiding infrastructure 312 (e.g., navigating based on virtual line paths or virtual waypoints), the vehicle may be said to navigate in a "free form" mode.

In various cases, it may be desirable to allow self-driving vehicles 110 to change between navigating in either a fixed path mode, or a free form mode.

Navigating the vehicle in a fixed path mode may be desirable to provide the vehicle with navigational determinism. Navigational determinism results from the predictable, and pre-determined path defined by the guiding infrastructure. In some cases, navigational determinism—offered by the fixed path mode—can allow the vehicle to safely increase its travelling speed along the pre-determined path without risk of collision. For instance, the vehicle may be operated to navigate in a fixed path mode, and at high travelling speeds, in areas having low or no pedestrian traffic.

Navigating the vehicle in a fixed path mode may not, however, be desirable in all circumstances. For example, it may not be desirable to operate the vehicle 110 to navigate in a fixed path mode if the vehicle is travelling through areas of high pedestrian traffic. In high pedestrian traffic areas, a vehicle following guiding infrastructure may be frequently interrupted by traffic crossing the infrastructure path. Navigating the vehicle in a fixed path mode may also not be desirable, more generally, where an unexpected (or unmapped) obstacle is blocking the infrastructure path. For example, in FIG. 3, an obstacle 306*c* may be displaced along the vehicle path, thereby blocking the vehicle from travelling further along the guiding infrastructure. Wear and tear in the guiding infrastructure may also result in discontinuities, which can also interrupt the vehicle travelling path. In these cases, it may be preferable to operate the vehicle to navigate in a free form mode to provide flexibility to maneuver around blocking obstacles or pedestrians and reach a desired destination location.

In view of the foregoing, providing self-driving vehicles with an option to change between navigating in a fixed path mode and a free form mode—as well as other suitable navigation modes—may allow self-driving vehicles to realize unique advantages offered by each mode of navigation.

Figure 4:
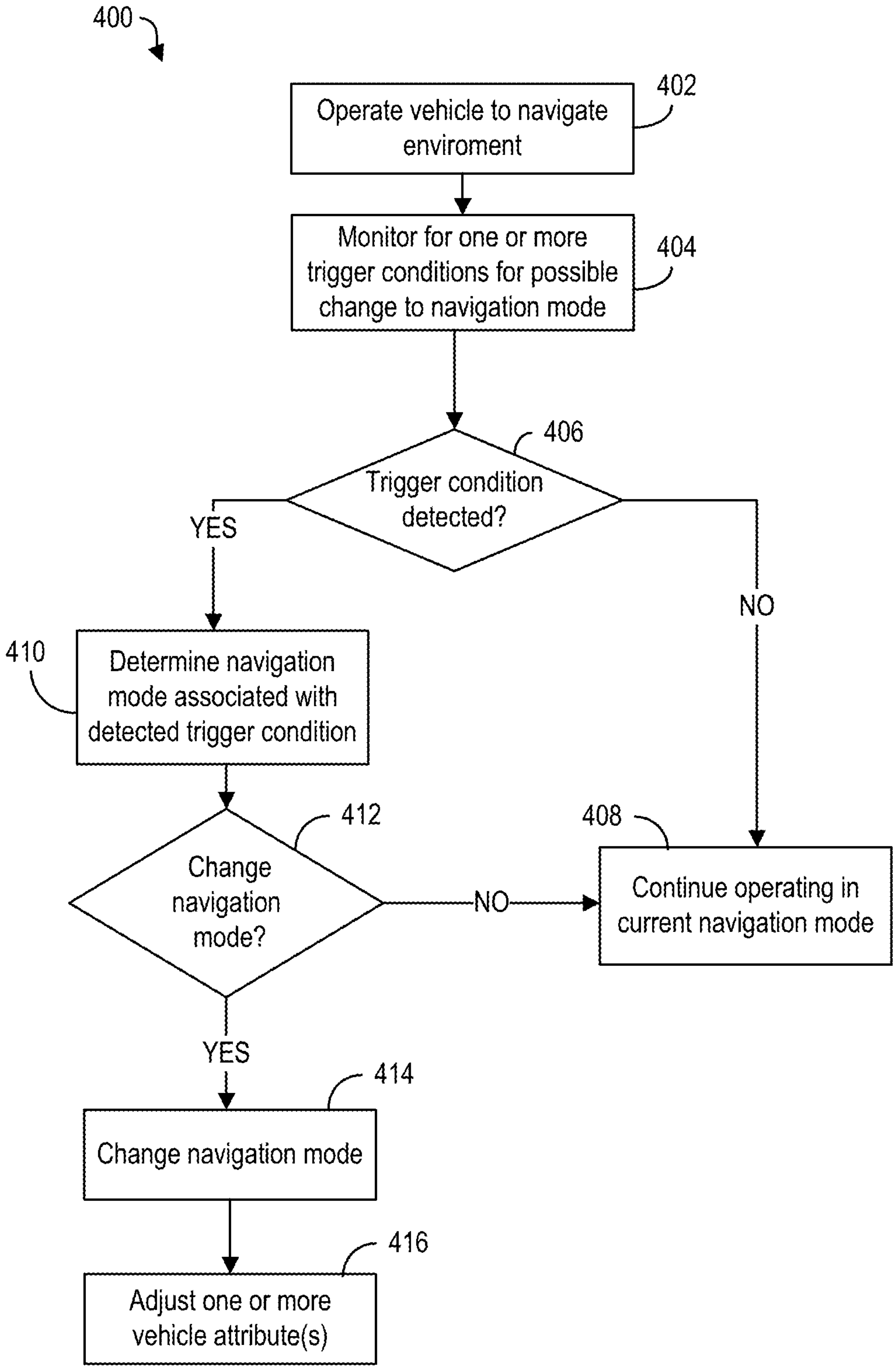
FIG. 4 is a flowchart of a process flow for an example method for operating a self-driving vehicle to change between navigation modes.

Referring now to FIG. 4, which is a flowchart of a process flow for an example method 400 for operating a self-driving vehicle to change between navigation modes.

At 402, the vehicle drive system 230 operates to navigate the vehicle 110 within its operating environment. For instance, the vehicle processor 212 can operate the vehicle drive system 230 in either a fixed path mode, a free form mode, or otherwise in any other suitable navigation mode.

At 404, the vehicle processor 212 monitors for one or more trigger conditions indicating a possible change to the vehicle's navigation mode. For example, the trigger condition may indicate that the vehicle should change to a fixed path mode, or a free form mode.

The trigger condition may involve detecting, for example, the presence or absence of guiding infrastructure 312 in proximity of the vehicle 110, or degradation or damage to guiding infrastructure 312. Detecting the presence of proximal guiding infrastructure may trigger the vehicle to change to a fixed path mode. In contrast, detecting the absence of proximal guiding infrastructure, or otherwise damaged or degraded guiding infrastructure, may trigger the vehicle to change out of a fixed path mode, or otherwise to change to a free form mode. The presence, absence, damage, or degradation of guiding infrastructure may be detected using the vehicle sensing system 220 (e.g., magnetic sensors detecting magnetic line tape, or a camera). Presence or absence of guiding infrastructure may also be detected with reference to an electronic map of the operating environment. For example, the electronic map may be updated with the locations of guiding infrastructure. Accordingly, the vehicle processor 212 may determine the presence or absence of guiding infrastructure based on the current position of the vehicle with reference to the electronic map.

The trigger condition can also include detecting indicators in the operating environment, indicating that the vehicle should change its navigation mode. Indicators may include both physical and non-physical indicators. Physical indicators can include, for example, objects or markers installed in the environment, e.g., QR codes, paint/tape traces, reflective markers, RFID tags. The markers can also be detected using one or more sensors of the sensing system 220 (e.g., cameras). Non-physical indicators may include detected signals, including specific frequency signals emitted by beacons 308 or a fleet management system 120 (e.g., command signals from the fleet management system), or optical signals (e.g., light beams, lasers, etc.) which indicate the vehicle should change its navigation mode.

The trigger condition may also involve detecting that the vehicle has arrived at a pre-determined location or area within its environment. For example, specific waypoints or areas of a facility can trigger the vehicle to change its navigation mode. The waypoints or areas which trigger a navigation mode change may be defined, for instance, in an electronic map accessible to the vehicle processor 212.

In other embodiments, the trigger condition may involve detecting unmapped objects or obstacles. For example, in FIG. 3, the presence of an obstacle 306*c* in the vehicle path may trigger the vehicle to change out of a fixed path mode and into a free form mode. Unmapped obstacles may also include, for example, pedestrian traffic blocking the vehicle path.

An event may also act as a trigger condition. For example, the vehicle processor 212 may receive a mission from the fleet management system 120 which requires the vehicle to navigate in either a fixed path mode or a free form mode resulting from the nature of the mission or the location where the mission is being carried out. In other cases, the event may be an input into the vehicle. For example, the input may include direct user interaction with the vehicle, in which a user activates a button or switch to prompt the vehicle to change navigation modes. In other cases, the input may relate to a motion gesture or verbal command by a user which is captured by a camera or audio sensor of the sensing system 220, and further processed by the vehicle processor 212. In still other cases, rather than being a user input, the inputs may be received from other automated machines (e.g., other machines activating buttons on the vehicle, or performing motion or auditory commands to control the vehicle).

The trigger condition may also be defined temporally. For instance, specific navigation modes may be associated with specific times of day. For example, during times of day defined by high pedestrian traffic (e.g., end of work shifts in an industrial facility), it may be preferable for the vehicle to navigate in a free form mode, rather than a fixed path mode.

In other cases, the trigger condition may involve detecting specific ambient environment conditions. For example, ambient dust or fog can debilitate the portion of the sensing system 220 (e.g., cameras) used in the free-form mode of operation. The detection of an increased amount of ambient dust or fog may be a trigger for the vehicle to enter into a fixed-path mode of operation. Conversely, the detection of a decreased amount of ambient dust or fog can be a trigger for the vehicle to enter into a free-form mode of operation.

The trigger condition may also involve any combination of the above-noted conditions. The vehicle processor 212 may monitor for trigger conditions continuously, or at pre-determined time intervals or pre-determined frequency intervals.

At 406, the vehicle processor 212 determines whether one or more trigger conditions have been detected.

At 408, if a trigger condition is not detected, the vehicle processor 212 resumes operating the vehicle in its current (or initial) mode of navigation. Otherwise, at 410, if a trigger condition is detected, the vehicle processor 212 determines a prospective navigation mode associated with the trigger condition. For example, the vehicle processor 212 may determine whether the trigger condition corresponds to changing into a fixed path mode, or a free form mode. For example, the presence of guiding infrastructure may indicate changing into a fixed path mode, while the absence of guiding infrastructure may indicate changing into a free form mode. In other cases, the trigger condition may include a received signal, which can indicate that the vehicle should navigate in either a fixed path mode or a free form mode. In still other cases, physical markers may be designated to indicate changing into either a fixed path mode or a free form mode.

In some embodiments, vehicle data storage 214 may store information corresponding to different types of detected trigger conditions, and corresponding navigation modes associated with each of the trigger conditions. Accordingly, once a trigger condition is detected, the vehicle processor 212 may cross-reference the detected trigger condition against the stored information to determine the corresponding navigation mode. In other embodiments, the mode of navigation may be indicated in the trigger condition. For example, vehicle processor 212 may receive a command signal from the fleet management system 120 indicating the mode of navigation the vehicle should adopt. In another example, the trigger condition can be arrival at a waypoint, and the electronic map accessible to the vehicle processor 212 may be annotated to include a specific navigation mode for the vehicle to change into at the waypoint.

At 412, the vehicle processor 212 determines whether to change to the prospective navigation mode associated with the detected trigger condition. This can involve determining whether a response condition is satisfied for responding to the detected trigger condition.

For example, the response condition can involve determining whether the prospective navigation mode is the same as the vehicle's current (or initial) navigation mode. For instance, the vehicle may be currently operating in the prospective navigation mode, in which case, the vehicle processor 212 may disregard the trigger condition at 412, and may resume operating in its current (or initial) mode of navigation. In still other cases, the response condition can involve determining the source of the trigger condition at 406. For example, particular detected trigger conditions generated by specific sources may only apply to certain vehicles (e.g., types or classes of vehicles), or vehicles carrying out specific missions. In some cases, the response condition may also involve determining that the trigger conditions apply only at specific times of day. In various cases, information about different response conditions associated with different triggers may be stored in the vehicle data storage 214 for cross-reference by the vehicle processor 212.

The response condition can also involve determining a current state of the sensing subsystem required to implement the triggered navigation mode. For example, if the vehicle processor 212 determines that the sensing subsystem required for the fixed-path mode (e.g., magnetic line sensors), is malfunctioning, the vehicle processor 212 may otherwise disregard a trigger to change into a fixed-path mode of navigation.

In still yet other cases, the response condition can involve determining override commands (e.g., global override commands) that prohibit the vehicle from changing to certain navigation modes (e.g., universally, or in specific contexts). The override commands may be pre-loaded into the vehicle processor 212, or may be received, for example, from the fleet-management system 120. In some cases, the override commands can require the vehicle to perform an emergency or controlled stop in response to the detected trigger condition.

In cases where the vehicle processor 212 disregards a trigger condition at 412, the vehicle continues navigating in its current mode at 408 (or otherwise perform an emergency or controlled stop), otherwise at 414, the vehicle may change its navigation mode into the navigation mode associated with the trigger condition.

At 416, in response to changing the vehicle navigation mode, the vehicle processor 212 adjusts one or more vehicle attributes.

In some cases, the adjusted vehicle attribute can relate to a travelling speed of the vehicle. For example, where the vehicle changes into a fixed path mode, the vehicle may increase its travelling speeds. For instance, guiding infrastructure may be generally installed in areas with low pedestrian traffic (e.g., pedestrian-free zones), thereby allowing the vehicle to increase its travelling speed while navigating in a fixed path mode. In other cases, where the vehicle changes navigation into a free form mode, the vehicle may operate at lower travelling speeds. For example, the vehicle may be generally prompted to change its mode into a free form mode in areas of high pedestrian traffic.

Figure 5A:
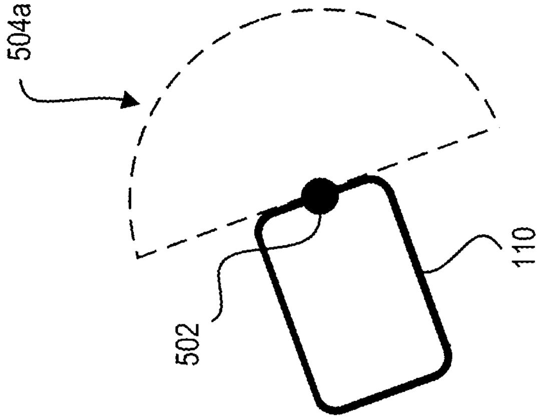
FIG. 5A is an example self-driving vehicle operating in a free form mode of navigation.
Figure 5B:
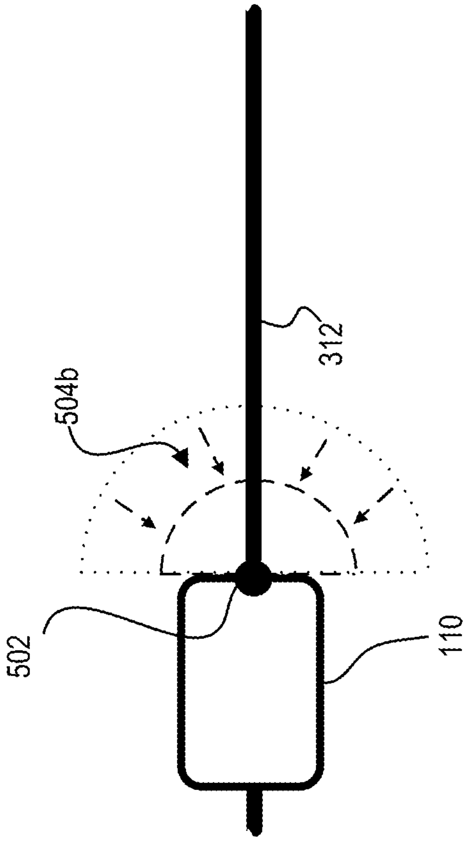
FIG. 5B is an example self-driving vehicle operating in a fixed path mode of navigation.

Referring now briefly to FIGS. 5A and 5B, shown therein is an illustration of an self-driving vehicle operating in a free form mode of navigation and a fixed path mode of navigation, respectively. As shown, the adjusted vehicle attribute can also relate to a detection range of the vehicle. The detection range includes an area defined with respect to the vehicle, and may be an area in which the sensing system 220 monitors for objects that need to be avoided. For example, in FIGS. 5A and 5B, a sensor 502, of sensing system 220, may be positioned at a forward-end of the vehicle 110, and can have a detection range 504. The sensor may include a LiDAR device, and the detection range 504 can represent a pre-defined scanning range for the LiDAR device. In these cases, the detection range 504 can be adjusted by the vehicle processor 212 by adjusting the scanning range of the LiDAR device. Otherwise the sensor 502 may be a depth perception camera, and the detection range 504 can represent a pre-defined depth and field of view for the depth perception camera. In these cases, the detection range 504 may be adjusted by the vehicle processor 212 by filtering out image area captured by the depth perception camera that is outside of the desired range. In other cases, one or more sensors 502 may also be positioned at other locations around the vehicle chassis to increase the vehicle detection range.

In at least some embodiments, the vehicle processor 212 can use a first detection range or set of detection ranges when operating into a free form mode (i.e., detection range 504*a* in FIG. 5A), and may use a second detection range or set of detection ranges when operating into a fixed path mode (i.e., detection range 504*b* in FIG. 5B), whereby the first detection range is larger than the second detection range. The detection ranges may also be adjusted in a non-uniform fashion. For example, the width of the detection range could be reduced while operating in fixed-path mode while maintaining the length of the detection range, thus allowing greater speeds to be achieved in tight spaces due to the higher degree of predictability typically present with fixed path modes.

In various cases, the vehicle may be operated in a free form mode in areas characterized by high pedestrian traffic, or otherwise areas which include sensitive or fragile objects. Accordingly, when operating in a free form mode, the vehicle may require larger or longer detection ranges for early-detection of objects or obstacles so as to provide the vehicle with sufficient buffer or reaction time to avoid colliding with the object or obstacle. In contrast, the vehicle may be generally operated in a fixed path mode in areas of low pedestrian traffic, in which case smaller or shorter detection ranges may be sufficient.

In at least some embodiments, fixed vehicle attributes may be associated with specific navigation modes. In other words, pre-defined vehicle attributes (e.g., detection ranges, vehicle speed, safety tolerances, required sensor presence, allocation of processing responsibilities, control loop update frequency, valid payload carrying methods and capabilities, etc.) may be associated specific navigation modes (e.g., fixed path or free form modes). The association between specific modes and associated vehicle attributes may be stored in the vehicle data storage 214 for cross-reference by the vehicle processor 212. In other cases, the vehicle attributes may not be necessarily mode-specific, but can be associated with specific types of trigger conditions. For example, specific types of trigger conditions—which trigger specific navigation modes—may also trigger specific changes in the vehicle attributes. For example, the vehicle attributes associated with a navigation mode triggered by a first type of trigger condition (e.g., detecting a first type of physical or non-physical indicator) may be different than the vehicle attributes associated with the same navigation mode triggered by a second type of trigger condition (e.g., detecting a second type of physical or non-physical indicator). In some cases, the vehicle data storage 214 may also store data relating specific types of trigger conditions, and corresponding vehicle attributes for the vehicle processor 212 to adopt in response to the trigger condition.

In view of the foregoing, it will be appreciated that the method 400 may allow a self-driving vehicle to flexibly operate and change between different navigation modes, thereby allowing the vehicle to realize advantages offered by each of the different modes of navigation.

Referring now back to FIG. 3, during operation of a self-driving vehicle in a fixed path mode, the vehicle may be required to stop—or perform tasks (e.g., picking-up, or dropping-off items)—at waypoints (e.g., intermediate points) or destination locations along the guiding infrastructure path. In some cases, the locations of these intermediate waypoints, or destination locations, may be known in advance to the vehicle processor 212. For example, in some cases, the vehicle processor 212 may have access to an electronic map that includes the locations of the relevant waypoints or destination locations. In other cases, the locations of the waypoints or destination locations may not be known in advance to the vehicle processor 212, in which case the self-driving vehicle may need to monitor its surrounding environment for markers of the waypoints or destination locations.

Figure 6B:
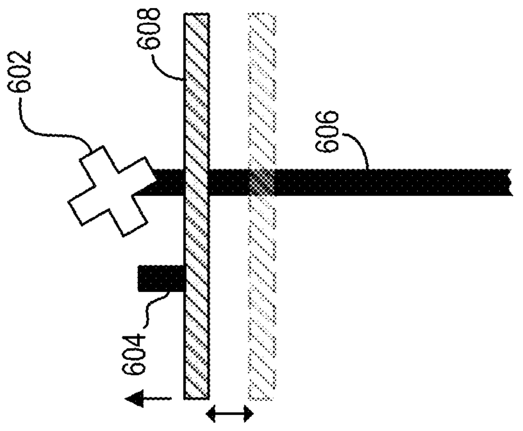
FIG. 6B is a schematic representation of the vehicle sensor detecting the marker of FIG. 6A.
Figure 6A:
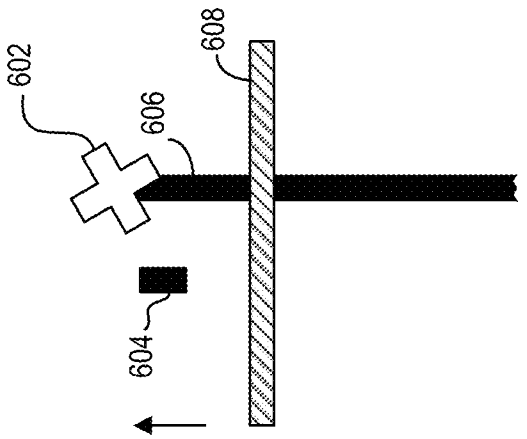
FIG. 6A is a schematic representation of a vehicle sensor approaching a marker indicating a waypoint location.

Referring now briefly to FIGS. 6A to 6B, which illustrates an example marker for indicating a waypoint location.

As shown, waypoint 602 is marked by a marker 604, located proximal the waypoint 602, and spaced from guiding infrastructure 606 (e.g., magnetic tape). Marker 604 can be a magnetic tape of the same or inverse polarity of the magnetic tape comprising guiding infrastructure 606. Marker 604 can also be an RFID marker, a paint trace, or the like. Marker 604 can be sensed by the vehicle sensor 608 (e.g., a line magnetic sensor) as the vehicle tracks and follows the guiding infrastructure 606. Upon sensing marker 604, the vehicle processor 212 may determine that it has arrived at waypoint 602. In various cases, the vehicle may come to an immediate stop upon detecting the marker 604.

It has been appreciated, however, that it may be preferable to provide advanced notice to a vehicle approaching a waypoint or destination location, especially in cases where the vehicle does not have recourse to an electronic map. In particular, where a vehicle is travelling at high speeds, providing advanced notice of a waypoint (or destination location) may allow the vehicle sufficient time to react and slow down prior to arriving at the waypoint or location. In the example of FIG. 6A, placing the marker 604 directly at the waypoint location may not provide the vehicle sufficient time to slow down. Accordingly, the vehicle may slide and overshoot the waypoint 602. Ensuring that a vehicle is able to stop directly at a waypoint or a destination location may be especially important in applications which demand high vehicle positional accuracy. For instance, this includes many industrial automation applications which may require vehicle positional accuracy of within ±1 cm, with a reliability of greater than 3σ (sigma). In cases where the vehicle has access to an electronic map to determine waypoint or destination locations, advanced notice may also provide added vehicle position accuracy over more relative electronic map information.

Figure 7A:
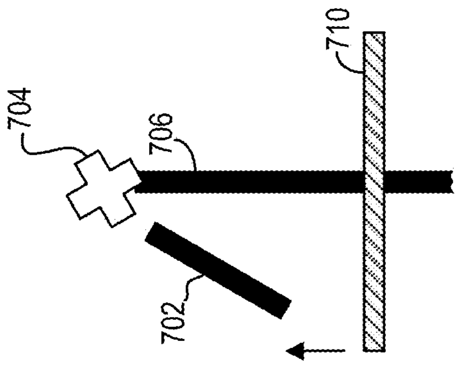
FIG. 7A is a schematic representation of a vehicle sensor approaching a proximity indicator located near a waypoint, according to some embodiments.
Figure 7B:
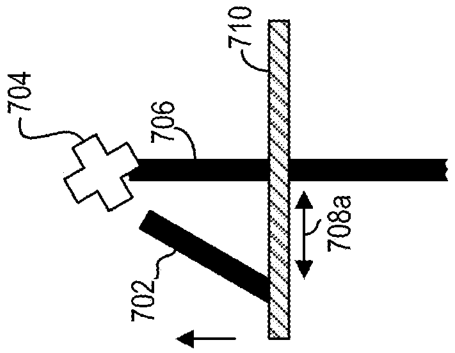
FIG. 7B is a schematic representation of the vehicle sensor detecting the proximity indicator shown in FIG. 7A.
Figure 7C:
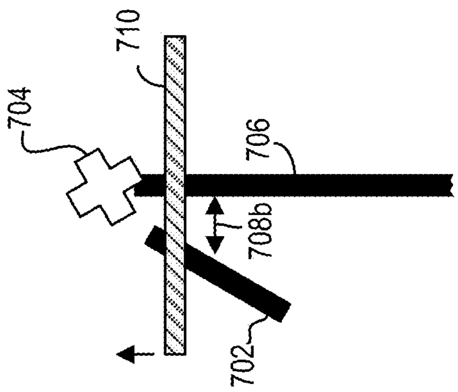
FIG. 7C is a schematic representation of the vehicle sensor passing over the proximity indicator shown in FIG. 7A.

Reference will now be made to FIGS. 7A to 7C, which illustrate an example proximity indicator for indicating the proximity of a vehicle to a waypoint.

In FIG. 7A to 7C, a proximity indicator is provided indicating the relative distance between the current position of the vehicle, and a waypoint. As shown, the proximity indicator includes a first marker 702 spaced from, and converging towards a second marker 706. The second marker 706 can be, for example, guiding infrastructure. Otherwise, second marker 704 can be a discrete marker for use with vehicles operating in a free form mode, or any other mode which is not a fixed path mode.

Lateral distance **708*a* between first marker 702 and the second marker 706 indicates the relative distance to waypoint 704. For example, FIG. 7C shows the lateral distance 708*b*, at the location of vehicle sensor 710, as being smaller than the lateral distance 808*a* in FIG. 7B. Accordingly, vehicle processor 212 can determine from lateral distance 708*b* that it is closer to the waypoint 704 than at the position 708*a*. In some cases, lateral distance 708 may be linearly proportionate to the remaining distance to waypoint 704, or may be otherwise related to the distance by any other relationship. Where the vehicle is operating in a fixed path mode, the vehicle processor 212 can monitor the lateral distance 708 using the same sensor 710 used for tracking guiding infrastructure 706 (e.g., a magnetic sensor), or otherwise using a second sensor (e.g., magnetic sensor a camera) in sensing system 220**.

In view of the foregoing, it will be appreciated that proximity indicator can both alert the vehicle processor 212 of a near-by way point, and also provide a general indication to the vehicle processor 212 of the proximity of the vehicle to the waypoint 704. In this manner, the vehicle is provided with advanced notice and sufficient time to prepare for the approaching waypoint 704. For example, the vehicle may reduce its travelling speed in time to stop at waypoint 704.

While FIGS. 7A to 7C provide one example embodiment of a proximity indicator, the proximity indicator may take any one of a number of different forms. For example, the proximity indicator 702 may be a diverging line, rather than a converging line. In these cases, lateral distance 708 may be inversely proportionate to the remaining distance to waypoint 704.

Alternatively, or in addition, rather than relying on lateral distance 708, the remaining distance to a waypoint 704 can be indicated by a thickness of the first marker 702. For example, the first marker 702 may taper in thickness toward the waypoint 704, or otherwise expand in thickness. In this case, the first marker 702 can be simply positioned parallel, or at any offset angle, to the second marker 706. In another example, a graduation of colors, or color intensities, indicate proximity to waypoint 704. In cases where thickness and/or color are used as proximity indicators, it may not be necessary to include both first and second markers 702, 706. For example, the proximity indicator may be integrated directly into the second marker 706 (e.g., the guiding infrastructure) by tapering, expanding or changing a color or color intensity of the second marker 706 proximal waypoint 704. In particular, in these cases, it may not be necessary to provide both the first marker 702 and the second marker 706.

In still other cases, the proximity indicator can be intersecting line segments. For example, in FIGS. 8A and 8B, a plurality of lines **702*a*, 702*b* and 702*c*, forming the first marker, intersect second marker 706**. The lateral width and/or thickness of each line 702*a*-702*c*—or the inter-line spacing—indicates relative distance to waypoint 704.

In still yet other cases, rather than the proximity indicator being line segments, the proximity indicator can include one or more of RFID markers or QR codes which indicate to the vehicle—upon detection by sensing system 220—a remaining distance to waypoint 704.

In various cases, rather than positioning the proximity indicators on the ground, proximity indicators may also be positioned along other surfaces in the environment (e.g., along a wall, or the side-face of an object proximal the waypoint). In still other embodiments, the proximity indicator may not be a physical marker (e.g., line segments, RFID tags and/or QR codes), but can include non-physical indicators, including optical indicators (e.g., LED lights of different intensities or colors positioned on the ground or along any other surface) and/or frequency indicators (e.g., emitted by a beacon, wherein the intensity or frequency indicates proximity to a waypoint 804). These indicators may be sensed using one or more sensors of sensing system 220.

Figure 9:
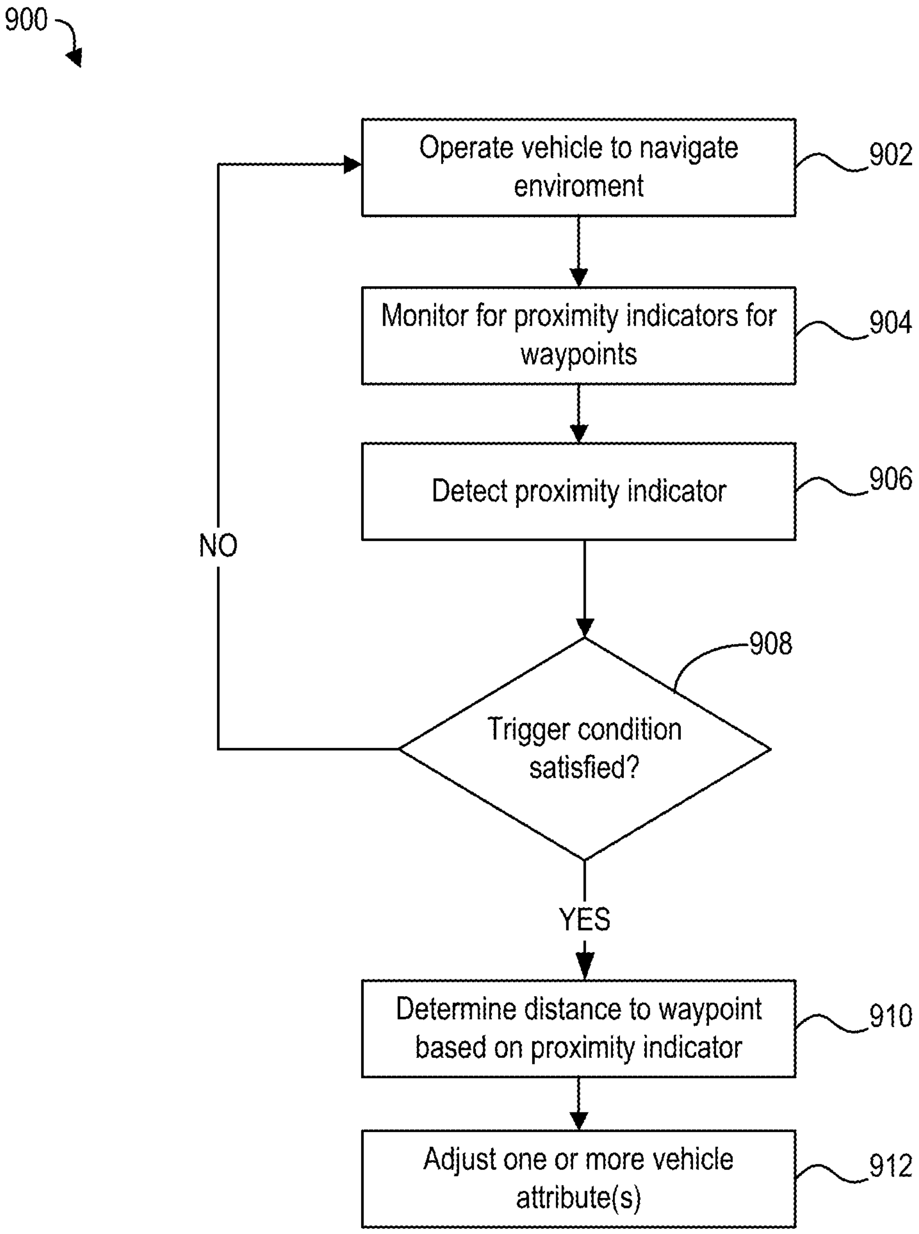
FIG. 9 is a flowchart of an example method of operating a self-driving vehicle with a view to vehicle positional accuracy.

Referring now to FIG. 9, which is a flowchart of an example method 900 for operating a self-driving vehicle with a view to vehicle positional accuracy.

At 902, the self-driving vehicle is operated to navigate its environment. The vehicle can operate, for example, either in a fixed path mode or a free form mode. The self-driving vehicle may navigate its environment, for example, in the course of executing one or more mission tasks which are required to be performed at one or more waypoint locations.

At 904, the vehicle processor 212 monitors for proximity indicators, indicating proximity of the vehicle to a waypoint. The proximity indicators may also indicate the relative distance between the current position of the vehicle, and the waypoint. The vehicle processor 212 may continuously monitor for proximity indicators, or otherwise, may monitor at pre-defined time or frequency intervals.

At 906, the vehicle detects a proximity indicator along, or near, the vehicle path.

At 910, the vehicle processor 212 determines whether a trigger condition is satisfied to respond to the detected proximity indicator.

For example, at 910, the trigger condition may include determining whether the detected proximity indicator is near a waypoint associated with a vehicle mission task. For example, the vehicle processor 212 may have access to an electronic map that includes waypoints and tasks (or jobs) to be performed at each waypoint. Accordingly, referencing the electronic map and using the vehicle's current position, the vehicle processor 212 can determine whether the detected proximity indicator is located near a relevant waypoint. If the proximity indicator is not near a relevant waypoint, vehicle processor 212 may ignore the proximity indicator and may continue navigating the vehicle in its usual course. Otherwise, if the vehicle is determined to approach a relevant waypoint, the vehicle processor 212 may respond to the proximity indicator.

In other cases, specific proximity indicators may only be relevant in certain circumstances (e.g., certain times of day), or otherwise may be relevant to specific types of vehicles. Accordingly, these may form additional trigger conditions which are evaluated prior to responding to the proximity indicator. In some cases, different trigger conditions may be stored in the vehicle data storage 214 for access by vehicle processor 212 upon detecting a proximity indicator.

Figure 8A:
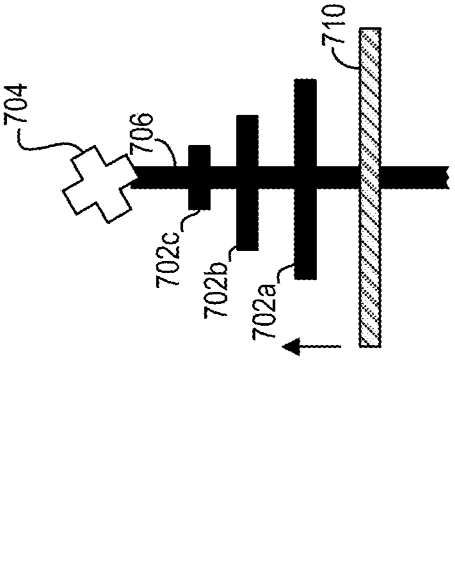
FIG. 8A is a schematic representation of a vehicle sensor approaching a proximity indicator located near a waypoint, according to some other embodiments.
Figure 8B:
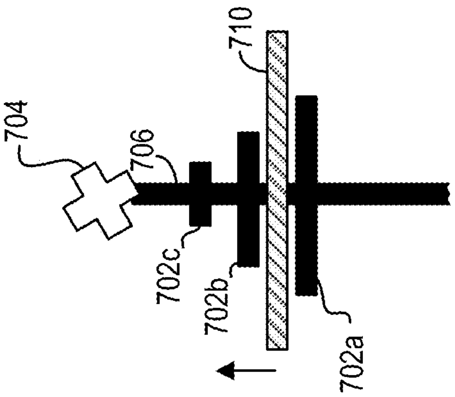
FIG. 8B is a schematic representation of the vehicle sensor detecting the proximity indicator shown in FIG. 8A.

At 910, if the vehicle processor 212 determines the trigger condition is satisfied, the vehicle processor 212 then analyzes the proximity indicator to determine the vehicle's relative proximity to the near-by waypoint. For example, the vehicle can determine the relative distance based on the lateral spacing between two markers (FIG. 7A to 7C), or otherwise the thickness, length or inter-spacing between intersecting markers (FIGS. 8A and 8B).

In at least some embodiments, vehicle data storage 214 can store information for different types of proximity indicators, and how each proximity indicator expresses a distance relationship to the near-by waypoint (e.g., lateral spacing distance, line thickness, etc.). In these cases, at 910, vehicle processor 212 can initially determine the type of proximity indicator detected, and may then access the stored information to determine the relevant distance relationship. Based on the determined relevant distance relationship, the vehicle processor 212 may determine a relative remaining distance to the waypoint.

At 912, in response to determining the relative remaining distance, the vehicle processor 212 varies one or more vehicle attributes. For example, the vehicle processor 212 can control the drive system 230 to slow down the vehicle in approaching the waypoint. In other cases, the adjusted vehicle attribute may involve preparing the vehicle for a task to be performed at the near-by waypoint. For example, the vehicle may prepare to pick-up or drop-off a load at the waypoint, and may accordingly begin raising or lowering load carrying elements (e.g., forks).

In view of the foregoing, it can be appreciated that the method 900 can provide for a convenient and simplified method for vehicles to be alerted and prepared for approaching waypoints.

Referring now back to FIG. 3, self-driving vehicles operating in a free form mode—or otherwise relying on electronic maps for navigation—may require up-to-date electronic maps for navigational accuracy. For example, this may include updating electronic maps with respect to new objects or obstacles (e.g., obstacle 306*c* along path 312) which can block the vehicle path. Additionally, the electronic maps may also be kept automatically to up-to-date with respect to the locations of guiding infrastructure (e.g., guiding infrastructure 312). In particular, this may allow self-driving vehicles to anticipate guiding infrastructure and either change to a fixed path mode, or otherwise anticipate vehicle traffic which may be travelling along the guiding infrastructure. This is in contrast to previous systems which may be otherwise unable to use vehicle capabilities to enhance the capabilities of the same or similar vehicles to operate in fixed path mode in the same environment.

Figure 10:
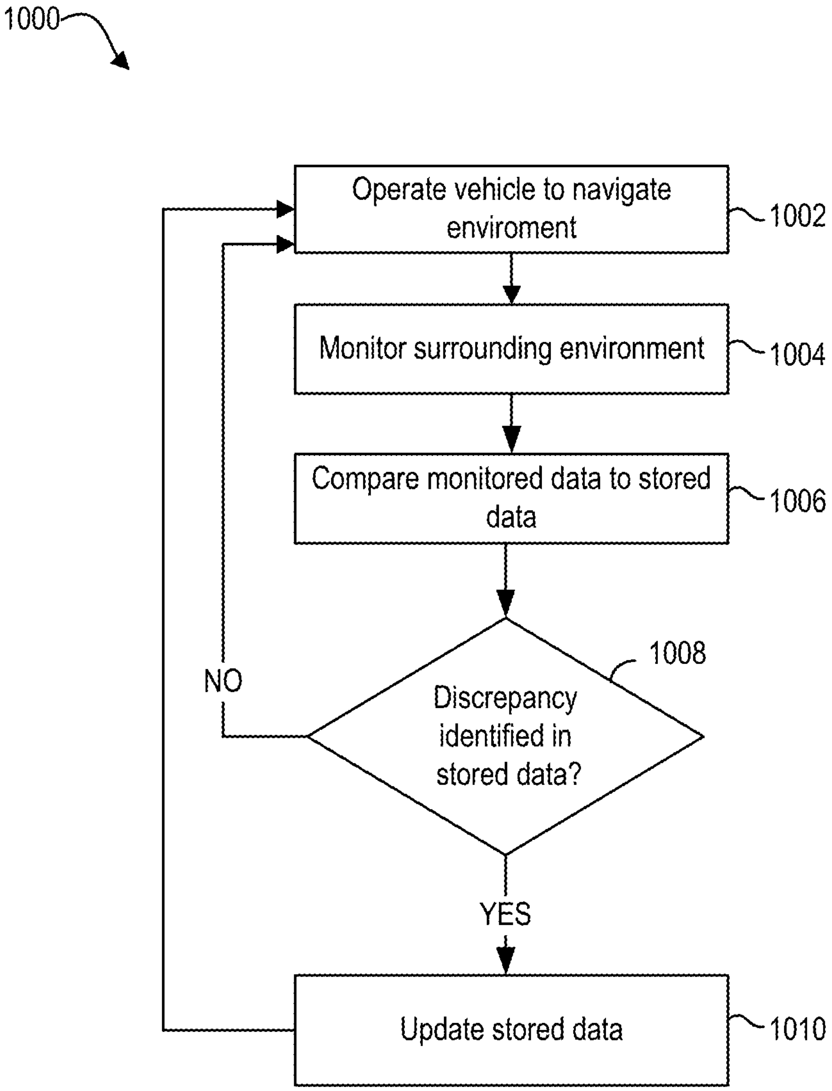
FIG. 10 is a flowchart of an example method for updating stored data for a vehicle operating environment to reflect the location of guiding infrastructure.

Referring now to FIG. 10, which is a flowchart of an example method 1000 for updating stored data of an operating environment to reflect the location of guiding infrastructure.

At 1002, the vehicle drive system 230 operates (e.g., by vehicle processor 212) to navigate the vehicle 110 within the operating environment.

At 1004, the vehicle processor 212 monitors the vehicle's surrounding environment based on sensor data received from one or more sensors in the vehicle sensing system 220. In particular, the vehicle processor 212 may monitor for the presence or absence of guiding infrastructure in the surrounding environment based on sensor data received from a magnetic sensor or a camera of the sensing system 220. The monitoring may occur continuously, or at pre-defined frequency or time intervals.

At 1006, the vehicle processor 212 compares the monitored data at, or near, its current position—in respect of the guiding infrastructure—to data stored in respect of the vehicle's operating environment. For example, vehicle processor 212 may compare the monitored data for guiding infrastructure to data stored in an electronic map of the environment at or near the vehicle's current position. The vehicle processor 212 may use any suitable localization method in order to determine the vehicle's current position.

At 1008, based on the comparison, the vehicle processor 212 determines whether or not a discrepancy exists between the monitored data and the stored data. For example, vehicle processor 212 can determine that an electronic map is missing indications of guiding infrastructure detected by the vehicle sensing system 220. Vehicle processor 212 can also determine that the electronic map includes indications of guiding infrastructure which are not detected or sensed by the vehicle sensing system 220.

If a discrepancy is not detected at 1008, the vehicle may continue navigating within its operating environment at 1002. Otherwise, if a discrepancy is detected, at 1010, the vehicle processor 212 may update the stored data (e.g., electronic map) to reflect the discrepancy, or otherwise flag the discrepancy.

Figure 11:
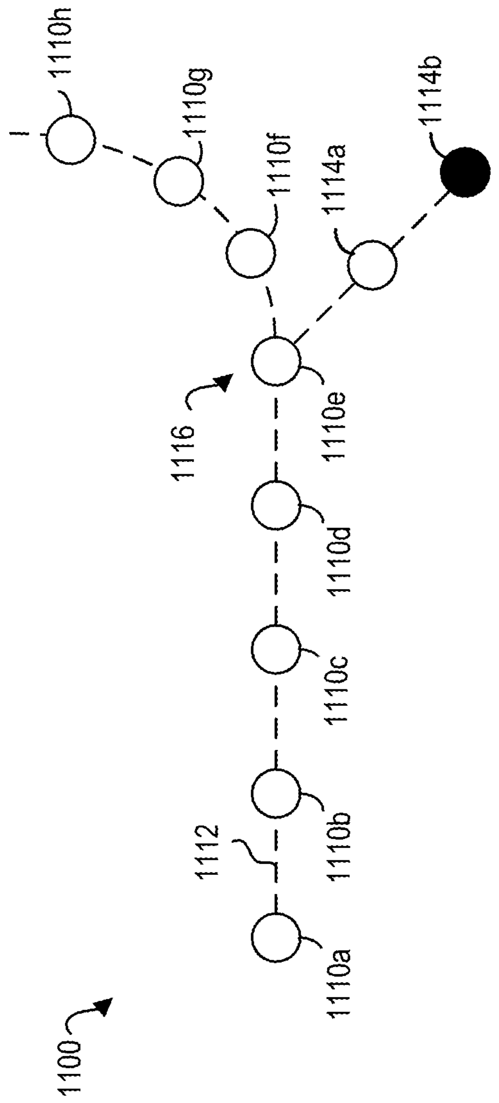
FIG. 11 is an illustration of an example electronic map, according to at least some embodiments.

Referring now briefly to FIG. 11, which shows an illustration of an example electronic map 1100 which includes indications of the positions of guiding infrastructure in an operating environment, according to at least some embodiments.

In various cases, electronic map 1100 can be updated by a vehicle processor 212 to include indications of guiding infrastructure not previously reflected in the map, but otherwise detected by the vehicle's sensing system 220. Electronic map 1100 can also be updated to remove or flag indications of guiding infrastructure reflected in the map, but not otherwise detected by the vehicle sensing system 220.

In the illustrated embodiment—upon detecting guiding infrastructure not reflected in the electronic map—vehicle processor 212 may update the map by including a series of graph nodes 1110*a*-1110*h* which represent the guiding infrastructure. Each graph node 1110 may indicate a discrete position along the path of the guiding infrastructure. The graph nodes may be spaced apart by any suitable distance.

In some cases, vehicle processor 212 may also update each new graph node 1110 with contextual metadata. The contextual metadata may include, for example, the pose of the robot at the location of the graph node, various sensor measurements detected at that pose (e.g., line scan data or image data), timestamp information, counters and labels for determining node type and state. In some cases, this contextual information can be used to identify if a graph node should be connected to another graph node in the case of a fork (e.g., fork 1116 in FIG. 11) or a merging in the path infrastructure.

In other cases, rather than representing the guiding infrastructure using graph nodes, the guiding infrastructure can be represented in any other form (e.g., as a continuous line). It will be appreciated, however, that an advantage of using graph nodes is to allow for a simplified sparse representation of the infrastructure path. Further, graph node data may be easily accessed and updated by other vehicles, and can also be easily combined and integrated with other measurement sources (e.g., scans and images). Still further, graph nodes allow the system to optimize information received from multiple vehicle sources.

Vehicle processor 212 may also remove graph nodes when no guiding infrastructure is detected by the vehicle sensing system 220 at the graph node position. For example, graph node 1114*b* may represent a node which is removed (e.g., deleted) from the electronic map where no guiding infrastructure was otherwise detected. In other cases, rather than removing undetected graph nodes, the vehicle processor 212 may simply flag these nodes for inconsistency.

In at least some embodiments, the updated electronic map generated by the vehicle processor 212 may be transmitted to the fleet management system 120. The fleet management system 120 may then synchronize and reconcile the updated map with maps received from other vehicles in a fleet of vehicles, or with 'as built' factory drawings produced when the guiding infrastructure was last physically modified. An adjusted updated map may then be transmitted—or otherwise made accessible—to all vehicles in the fleet. In some cases, a de-centralized system may be used, whereby the updated map generated by the vehicle is broadcast to other vehicles, which may then further update the map or otherwise reconcile the updated map with information in locally stored maps.

Information in updated electronic maps—generated through the method 1000—can also be used subsequently by vehicles to generate line segment information corresponding to guiding infrastructure in the environment (e.g., line segment 1112 in FIG. 11). For example, this can involve simply connecting adjacent graph nodes to form line segments. Otherwise, where graph nodes track a curved line (e.g., graph nodes 1110*f*-1110*h*), curve fitting techniques can be used to track the curved path. The line segments can also be generated having regard to contextual metadata stored in association with the graph nodes. For example, contextual metadata can indicate that two graph nodes should be connected to form a fork or merger in the path.

In various cases, line segment data generated from graph nodes can be used by vehicles operating in a fixed path mode to follow guiding infrastructure. In particular, the line segment data can be used as an alternative to the vehicle blindly tracking and following the position of the guiding infrastructure. For example, a vehicle operating in a fixed path mode can rely on the extracted line segment information to map the guiding infrastructure path, and anticipate changes in the path direction. Accordingly, if the electronic map indicates a curve in the guiding infrastructure, the vehicle may adjust its travelling speed to ensure that it can safely turn with the curved line. In other cases, if the electronic map indicates a straight line section along the infrastructure path, the vehicle may determine that it may safely increase its travelling speed along the straight line portion of the path.

Generated line segment data from electronic map information may also be used by vehicles in a fixed path mode to predict and anticipate behavior of other vehicles detected along the same path line. Accordingly, this may avoid collisions or other conflicts between the vehicle and other vehicles travelling the same line path.

Extracted line segment data from updated electronic maps may also assist vehicles which are not operating in a fixed path mode. For example, in FIG. 3, a vehicle 110*b* approaching guiding infrastructure may rely on the updated electronic map to proactively anticipate the guiding infrastructure. Accordingly, the vehicle 110*b* may slow down on approach and may direct its sensing attention along the line to detect any approaching vehicles (e.g., vehicle 110*a*), and otherwise avoid a potential collision.

The graph nodes in an updated electronic map can also be used by other vehicles to determine breaks in the guiding infrastructure (e.g., break 316 in FIG. 3), which can either be reflected in error alerts transmitted to a fleet management system 120 or otherwise reflected in a further map update.

In still other cases, graph nodes in the electronic map can be used for vehicle localization. In other words, the vehicle processor 212 operating in any mode (e.g., fixed path mode or free form mode) can cross-reference detected guiding infrastructure with graph nodes in the electronic map to better determine its current position relative to the electronic map.

Referring now back to FIG. 3, in many cases, in the course of performing task missions—or otherwise navigating the environment—self-driving vehicles may travel through different areas of the operating environment characterized by varying levels of pedestrian traffic. To ensure safe and effective operation of the vehicle, the vehicle may be required to adjust one or more vehicle attributes to accommodate the surrounding level of pedestrian traffic.

By way of example, a vehicle travelling in a high pedestrian traffic area may adjust to using larger detection ranges and/or lower travelling speeds, i.e., to avoid collisions with pedestrians. In other cases, a vehicle travelling in an area of low, or no pedestrian traffic, may operate using smaller detection ranges and/or higher travelling speeds.

To facilitate vehicle operation, various areas of the vehicle's operating environment may be pre-defined, for example, as either pedestrian-exclusion zones, low pedestrian traffic zones or high pedestrian traffic zones. The boundaries of these zones may be defined both spatially and/or temporally. For example, as shown in FIG. 3, zones may be defined spatially as simple rectangular areas **318*a*, or areas having any suitable shape or boundary definition (e.g., area 318*b***). The zones may also be defined temporally. For example, areas may be defined as pedestrian-exclusion zones and/or high pedestrian traffic zones based on the time of day. For instance, in an industrial facility, certain areas may be defined as high traffic zones during start or end of work shift hours.

In other cases, zones may not be necessarily defined with respect to pedestrian traffic flow, but may be defined having regard to other considerations. For example, zones may be pre-defined having regard to types of objects (e.g., fragile objects) located within the zone. For instance, areas in a facility which have a large number of sensitive objects may be bounded by special zones requiring the vehicle to operate using larger detection ranges and/or lower travelling speeds. Similarly, zones may be defined with respect to surrounding environmental conditions. For example, areas in a facility with narrower navigation paths (e.g., closely spaced shelves), may also require the vehicle to operate with smaller detection ranges and/or lower travelling speed. In other cases, zones in which visibility conditions are poor (e.g., outdoor areas with increased dust or fog) may also require the vehicle to operate with smaller detection ranges and/or lower travelling speed.

In some embodiments, the zones may be pre-defined for the vehicle in an electronic map of the vehicle's operating environment. For example, the zones may be defined inside of the electronic map by the fleet management system 120. Otherwise, zones may be demarcated by zone indicators installed in the operating environment. The zone indicators may include, for example, physical indicators (e.g., tape or paint traces) or non-physical indicators (e.g., emitted beacon signals).

Where zones are pre-defined in an electronic map, it may be important—for safety reasons—to ensure that the vehicle is correctly localized within the zone before adjusting a relevant vehicle operating attribute (e.g., detection range and/or travelling speed). This ensures, for example, that the vehicle does not decrease its detection range and/or increase its travelling speed outside of a pedestrian-exclusion zone, or inside a high pedestrian traffic zone, thereby resulting in a possible vehicle collision with pedestrians.

Figure 12:
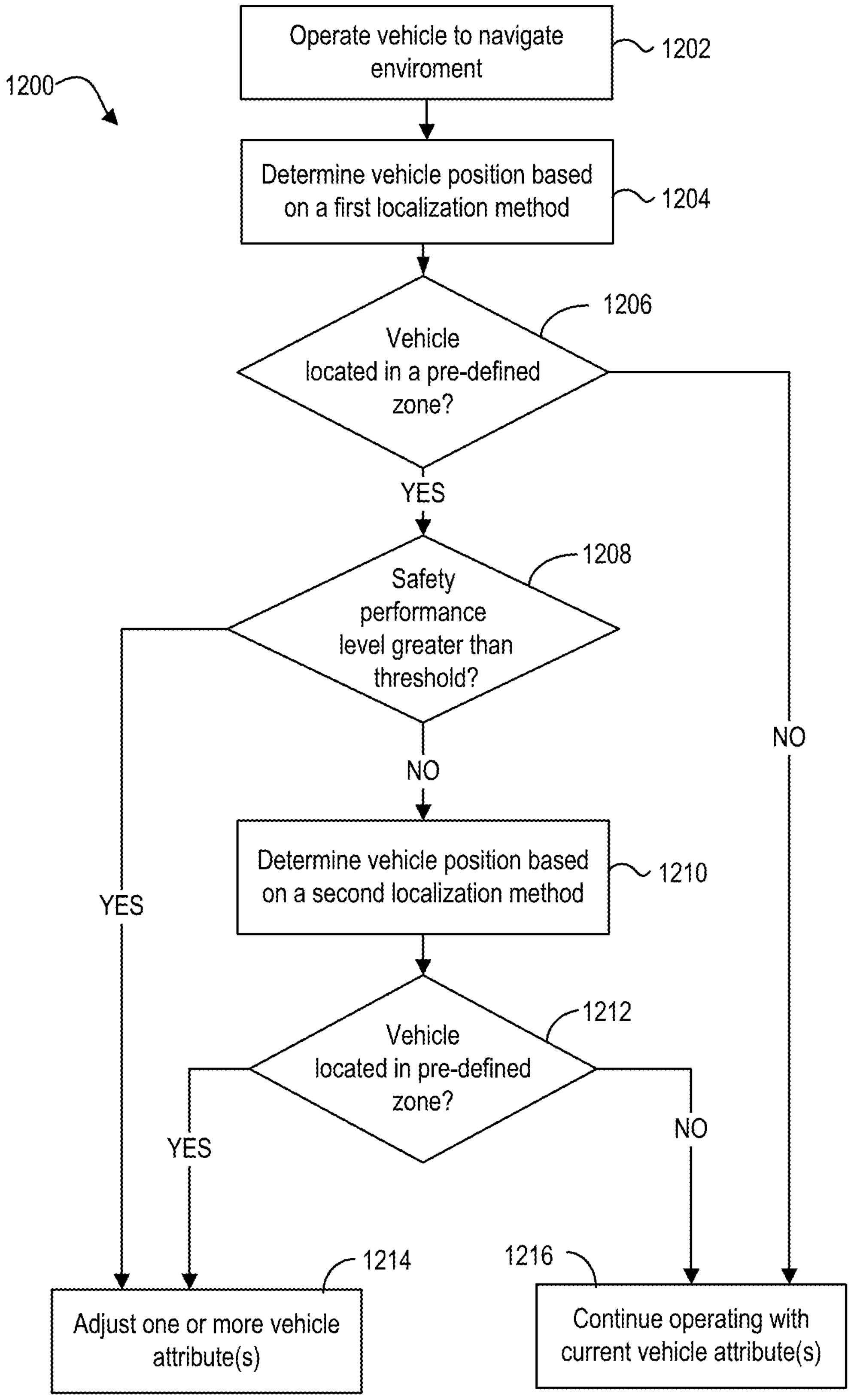
FIG. 12 is an example method for operating a self-driving vehicle in an operating environment.

Referring now to FIG. 12, which shows an example method 1200 for operating a self-driving vehicle in an operating environment with pre-defined zones.

At 1202, the vehicle drive system 230 may be operated to navigate the vehicle within its operating environment.

At 1204, a first localization method may be used to localize the vehicle within an electronic map. The first localization method may include, for example, determining the vehicle position with reference to markers or objects in the surrounding environment. The objects or markers may be identified by the vehicle using one or more sensors of the sensing system 220 (e.g., LiDAR, cameras, etc.) and cross-referenced to the known location of the objects and markers in the electronic map. The object or markers may be, for instance, natural features in the environment (e.g., walls, corners, etc.), or otherwise objects or markers placed in the environment (e.g., shelves, tape, RFID markers, etc.). In other cases, the first localization method may involve using a Global Positioning System (GPS) as part of the sensing system 220. In still other cases, the first localization method may be based on emitted signals from beacons installed in the environment (e.g., using triangulation). In some cases, the beacons may be configured for ultra wide band (UWB) localization in which the vehicle transmits and receives short pulses from the UWB configured beacons to localize its position.

At 1206, based on the vehicle position determined from the first localization method, the vehicle processor 212 may determine whether the vehicle is positioned in a pre-defined zone defined in an electronic map accessible to the vehicle processor 212. For example, this may include determining whether the vehicle is in a pedestrian-exclusion zone, a low traffic pedestrian zone, or high traffic pedestrian zone, or otherwise any other suitably defined zone.

If the vehicle is not determined to be located in a pre-defined zone at 1208, at 1216, the vehicle processor 212 may apply one or more default vehicle attributes, or otherwise, resume normal operation of the vehicle.

Otherwise, if the vehicle is determined to be located within a pre-defined zone, at 1208, it can be determined whether the safety performance level of the sensing subsystem (e.g., a sensor, or group of sensors in the sensing system 220, as well as the processing function which processes the sensor data to determine location), used in the first localization method, is equal to or exceeds a pre-determined safety performance level threshold.

In particular, the safety performance level (PL) of a sensing subsystem can be associated with a probability of hazardous failure of that subsystem. For example, under ISO® safety standards, systems can have one of five safety performance level categorization ("a", "b", "c", "d", and "e"), wherein systems having a PL of "a" have a probability of dangerous failure per hour (PFHd) in a range of 0.001% to 0.01%, while systems having a PL of "e" have a PFHd in a range of 0.000001% to 0.00001%. In other cases, any other suitable standard or statistical performance metric can be used to quantify the safety level and accuracy of specific sensing subsystems used in determining vehicle location. In some embodiments, the PL of a given sensor subsystem used for localization may be stored for reference in the vehicle data storage 214.

Accordingly, at 1208, the vehicle processor 212 can determine whether the safety performance level of a sensing subsystem—used in the first localization method—is equal to or exceeds a required safety performance level threshold (e.g., a PL level of "a", "b", "c", "d", or "e"). The required safety performance threshold may vary based on the pre-defined zone detected at 1206. For example, higher safety performance levels may be required when the vehicle is localized in a pedestrian-exclusion zone—or low pedestrian traffic zone—in which the vehicle is allowed to increase its travelling speed or decrease its detection range. More specifically, it may be important, in these cases, to ensure that the sensing subsystem—used in the first localization method—has a sufficient PL to correctly localize the vehicle within these zones, and otherwise avoid inadvertently increasing the vehicle speed in an area which, in-fact, includes pedestrian traffic. In some cases, the electronic map that includes the zone-boundary information may also include information about safety level performance thresholds associated with each zone.

In other cases, the required safety performance level threshold can also depend on sensing—e.g., using sensing system 220—past or current levels and types of traffic in the vehicle's surrounding environment. For example, specific levels of traffic (e.g., heavy versus light traffic) and specific types of traffic (e.g., pedestrian versus vehicle traffic) can be correlated to pre-defined safety performance level thresholds stored in the vehicle data storage 214. For example, heavier levels of surrounding traffic, or otherwise pedestrian type traffic, can correlate to higher safety performance level thresholds. Similarly, the required safety performance level threshold can also be correlated to the amount of free space detected around the vehicle by sensing system 220 (e.g., lower amounts of free space may correlate to higher required safety performance level thresholds, and vice-versa).

If the sensing subsystem used in the first localization method is determined to have a safety performance level above the pre-determined threshold at 1208, the method 1200 may continue to 1214, and the vehicle processor 212 may adjust one or more vehicle attributes as explained in further detail herein.

Otherwise, at 1208, if the sensing subsystem used in the first localization method is determined to have a safety performance level that is less than the pre-determined threshold, then a second localization method may be used to further localize the vehicle position. In particular, the second localization method can increase the accuracy of the first localization method, as well as increase the overall safety performance level of the combined sensing subsystems used for localization.

In various cases, the second localization method may use different sensors in the sensing system 220 than the first localization method. The sensor data—generated by the sensors used in the second localization method—may also be processed by separate processor(s) than the processor(s) used to process sensor data in the first localization method. For example, the vehicle processor 212 may include more than one vehicle processor 212, each vehicle processor being configured to separately receive (e.g., via separate input/output connections), and process different sensor data from different sensors of sensing subsystem 220. In this manner, the second localization method may be control-reliable, in that the second localization subsystem may be otherwise decoupled from the first localization subsystem, and may be able to independently determine vehicle position.

At 1212, based on the vehicle location determined by the second localization method, the vehicle processor 212 may determine (or otherwise confirm) whether the vehicle is positioned in the pre-defined zone previously determined at 1206.

In cases where contradictions exist between the first and second localization methods, these contradictions can be resolved based on a comparison of the safety performance levels attributed to each sensing subsystem used in the first and second localization methods. For example, if a high safety performance level is required and only the second localization sensing subsystem is capable of providing an output with the required degree of reliability, then the vehicle location may be determined based on the output from the second localization subsystem only. Conversely, if neither the first or second localization methods use sensing subsystems capable of independently operating at the requisite performance level, but the combination of both results can be a suitable performance level, or have matching performance levels, then a conflict can be mitigated by operating the self-driving vehicle in a pre-defined safe state (e.g., at 1216). In various cases, the pre-defined safe state can be a known safe state. In some embodiments, all motor controllers of the drive system 230 can be powered off in the known safe state.

If the vehicle is determined to be located inside a pre-defined zone at 1206 or 1212, the vehicle processor 212 may apply one or more zone specific vehicle attributes. For example, the vehicle processor 212 may vary the size of the detection range and/or travelling speed. For instance, in a pedestrian-exclusion zone or a low traffic pedestrian zone, the vehicle processor may decrease the size of the detection range and/or increase the vehicle travelling speed. Otherwise, in a high traffic pedestrian zone, the vehicle processor 212 may increase the size of the detection range and/or decrease the vehicle travelling speed.

In some embodiments, the vehicle data storage 214 may store a plurality of zone definitions, and corresponding vehicle attributes. Upon determining that the vehicle is located in a pre-defined zone, the vehicle processor 212 may apply the corresponding vehicle attributes stored in the vehicle data storage 214 for that zone.

In other cases, upon entering a pre-defined zone, the vehicle processor 212 may query the fleet management system 120 for relevant vehicle attributes associated with the zone. In still other cases, the vehicle attributes may be automatically transmitted to the vehicle, e.g., by the fleet management system 120, upon entering the pre-defined zone. In still yet other cases, indicators may be located in, or around, the pre-defined zone (e.g., RFID tags or QR indicators), which may be detected by the vehicle sensing system 220 and which can be read to identify one or more zone specific vehicle attributes.

In some embodiments, the first localization method and the second localization method can be considered primary and secondary localization methods, respectively. In some embodiments, the primary localization method can be used by default and the secondary localization method can be used as an alternative to the default method. The secondary localization method can be used when, for example, the primary localization method does not satisfy safety performance level requirements, or when the sensors of the first localization method are unavailable.

While method 1200 has only been described herein with reference to a first and second localization method, it will be appreciated that any number of localization methods can be used to achieve a required safety performance level threshold.

In some embodiments, vehicle attributes may also be adjusted more generally based on determining that the vehicle is in gross proximity to pedestrians or objects, rather than being localized within a particular zone.

Figure 13:
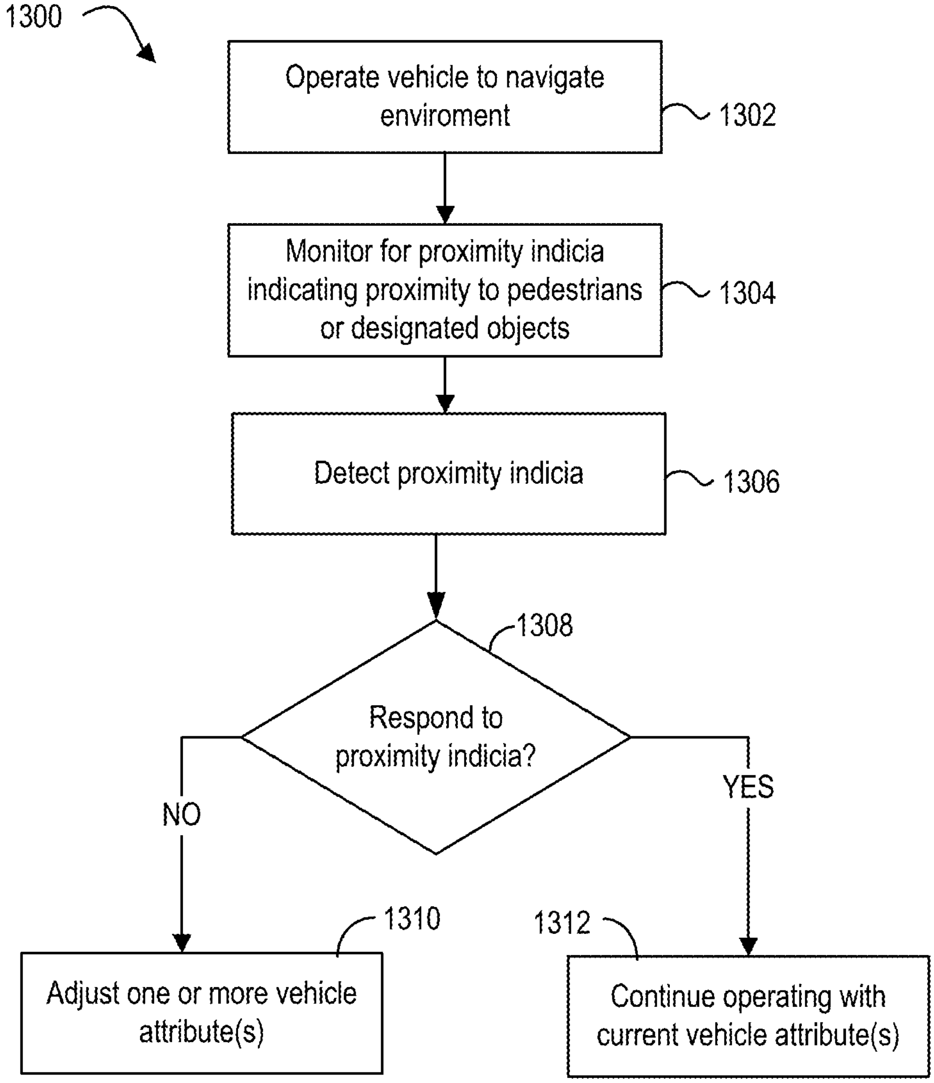
FIG. 13 is an example method for operating a self-driving vehicle with proximity detection.

Referring now to FIG. 13, which is an example method 1300 for operating a self-driving vehicle with proximity detection.

At 1302, the drive system 230 is controlled to navigate the vehicle within its operating environment.

At 1304, the vehicle processor 212 monitors for proximity indicia indicating that the vehicle 110 is within proximity to pedestrians or designated objects. Designated objects can be stationary or mobile. Designated objects may include but are not limited to sensitive or fragile objects, or other self-driving vehicles.

Examples of proximity indicia may include detecting near-by pedestrians or designated objects in images captured by a camera of the sensing system 220. For example, captured images can be analyzed to detect known and/or identifiable appearances or shapes associated with human pedestrians, or specific objects of interest (e.g., fragile objects). Image sequences (e.g., digital video) can also be analyzed to detect motion patterns also associated with pedestrian motion (e.g., gait motion), or otherwise associated with specific mobile objects. In various cases, the vehicle processor 212 may be pre-configured (e.g., pre-trained) to identify the relevant pre-determined shapes, appearances or motion patterns in captured images, or image sequences.

Proximity indicia can also include detecting semantic cues in the surrounding environment which indicate close-by pedestrian traffic. Semantic cues can include but is not limited to audio cutes, visual cues (e.g., detecting open doors) and the operating environment surrounding the vehicle (e.g., ambient light detected at an intensity of greater than a predefined threshold, such as 1000 lux for normal ambient light levels). Semantic cues can also include detecting specific audio cues, including speech chatter or foot step sounds. These cues can be monitored using one or more sensors of sensing system 220 (e.g., light sensors, cameras, etc.). In some embodiments, the monitoring of semantic cues can be assisted with vehicle localization methods. For example, vehicle processor 212 may localize the vehicle's position within an electronic map to determine proximity to a semantic cue (e.g., a door). Based on the localization, the vehicle processor 212 may cause the sensing system 220 to further monitor the relevant semantic cue in order for the processor 212 to determine its state (e.g., opened or closed door).

Monitoring for proximity indicia can also include detecting—using sensing system 220—indicators affixed to pedestrians or designated objects. Indicators can include RFID tags, reflective markers, and/or quick response (QR) codes. Indicators can also include frequency or light emitting indicators, such as beacons or lights. In some cases, wireless mesh networks may be used, in which transceivers are mounted to pedestrians and/or designated objects in the operating environment as well as to the self-driving vehicle, and established communication between transceivers may allow the self-driving vehicle to determine its relative proximity to pedestrians and/or designated objects.

In other cases, the proximity indicia may involve using a mounted perimeter guard, i.e., an area scanner in sensing system 220 (e.g., LiDAR sensors), which is mounted to the vehicle and used to detect proximity to people. The perimeter guard may be positioned at a pre-defined elevation such as to detect surrounding pedestrians, but otherwise overlook surrounding vehicles located below the mounting elevation.

At 1306, a proximity indicia can be detected.

At 1308, it can be determined whether a trigger condition is satisfied to respond to the detected proximity indicia.

The trigger condition at 1308 may involve, for example, determining whether the vehicle is within a pre-determined distance of the detected pedestrians or designated objects (e.g., within 10 to 20 meters). For example, if the vehicle is far away from detected pedestrians or designated objects, the vehicle processor 212 may, at least temporarily, disregard the detected proximity indicia. Otherwise, if the vehicle is within the pre-determined distance, the vehicle processor 212 may respond to the detected proximity indicia as explained in further detail herein with reference to act 1310. The distance between the vehicle and detected pedestrians and/or designated objects can be determined using one or more sensors of the sensing system 220. For instance, data from depth-perception enabled cameras of sensing system 220 can provide distance determinations. Similarly, time-of-flight sensors (e.g., LiDAR) can also provide similar distance determinations.

The pre-determined separation distance—as between the vehicle and detected pedestrians or objects—which is required to satisfy the trigger condition at 1308 may also be modified based on the vehicle speed. In other words, different vehicle travelling speeds can vary the required pre-determined separation distance required to satisfy the trigger condition at 1308. For example, at higher travelling speeds, a greater separation distance may be sufficient to satisfy the trigger condition at 1308. Otherwise, at lower travelling speeds, a smaller separation distance may be sufficient to satisfy the trigger condition. The vehicle speed can be determined by the vehicle processor 212 based on communicating with the drive system 230, or based on one or more speed sensors in sensing system 220. In other cases, the pre-determined separation distance may also be modified based on the speed of the detected pedestrian and/or mobile objects. For example, on-coming pedestrian or objects, which are travelling at high-speeds, may result in larger separation distance being sufficient to satisfy the trigger condition.

In some cases, vehicle data storage 214 can store a look-up table correlating different separation distances, required for satisfying the trigger conditions, to different modifying factors (i.e., vehicle travelling speeds, or pedestrian/object speed).

The trigger condition at 1308 can also involve determining that the vehicle path intersects the detected pedestrians and/or designated objects. For example, if the vehicle path is turning-away from the detected pedestrians or objects, the vehicle processor 212 may otherwise ignore the proximity indicia. Similarly, where pedestrians and/or mobile objects are travelling away from the vehicle or vehicle path, the vehicle processor 212 may also disregard the detected proximity indicia.

In at least some embodiments, determining whether to respond to the proximity indicia can involve any combined determination of the above-noted factors. At 1310, if the trigger condition to respond to the proximity indicia is satisfied at 1308, the vehicle processor 212 may adjust one or more vehicle operating attributes. For example, the vehicle processor 212 may decrease the vehicle travelling speed and/or increase the detection range (e.g., buffer range). In some cases, the vehicle processor 212 may also control the drive system 230 to change the direction of motion of the vehicle to avoid the detected pedestrians and/or objects.

In some embodiments, the adjusted vehicle attributes can be adjusted having regard to the type of proximity indicia detected at 1306. For example, proximity indicia indicating proximity to pedestrians may prompt the vehicle processor 212 to adopt a more cautious behavior, and apply lower travelling speeds and/or larger detection ranges. In some cases, vehicle data storage 214 can store associations between specific vehicle attributes and specific detected proximity indicia. In other cases, the proximity indicia may itself indicate specific vehicle attributes for the vehicle processor 212 to adopt. For example, frequency signals emitted from frequency indicators can include information about the vehicle attributes the vehicle processor 212 should adopt. In other cases, vehicle attribute information can be determined based on communication with the fleet-management system 120.

In some cases, the vehicle attributes can also be adjusted as a function of the determined proximity of the vehicle to pedestrians and/or designated objects. In other words, the vehicle attributes may change as the vehicle draws closer to the pedestrians and/or designated objects. For example, the vehicle may slow down or use small detection ranges as it approaches pedestrians and/or designated objects In cases where the trigger condition is not satisfied at 1310, at 1312, the vehicle processor 212 may continue operating the vehicle with its current (or default) vehicle attributes.

In some cases, a self-driving vehicle may be operable to carry-out a combination of both methods 1200 and 1300. For example, the vehicle processor 212 may perform method 1200 when it determines that it is located within a pre-defined zone (e.g., 1206 in method 1200), otherwise outside of pre-defined zones, the vehicle processor 212 may perform the method 1300. In other words, the vehicle processor 212 can adjust vehicle attributes based on either proximity detection to pedestrian or objects, as well as detecting that the vehicle is within pre-defined zones. In various cases, this may provide more flexibility for the vehicle to respond to its surrounding environment in varying situations.

Unless the context requires otherwise, throughout the specification and claims which follow, the word "comprise" and variations thereof, such as, "comprises" and "comprising" are to be construed in an open, inclusive sense, that is, as "including, but not limited to." It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies. In addition, as used herein, the wording "and/or" is intended to represent an inclusive or. That is, "X and/or Y" is intended to mean X or Y or both, for example. As a further example, "X, Y, and/or Z" is intended to mean X or Y or Z or any combination thereof. It should be noted that the term "coupled" used herein indicates that two elements can be directly coupled to one another or coupled to one another through one or more intermediate elements.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a keyboard, mouse, touchscreen, or the like), and at least one output device (e.g. a display screen, a printer, a wireless radio, or the like) depending on the nature of the device.

It should also be noted that there may be some elements that are used to implement at least part of one of the embodiments described herein that may be implemented via software that is written in a high-level computer programming language such as one that employs an object-oriented paradigm. Accordingly, the program code may be written in Java, C++ or any other suitable programming language and may include modules or classes, as is known to those skilled in object-oriented programming. Alternatively, or in addition thereto, some of these elements implemented via software may be written in assembly language, machine language or firmware as needed. In either case, the language may be a compiled or interpreted language.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail since these are known to those skilled in the art. Furthermore, it should be noted that this description is not intended to limit the scope of the embodiments described herein, but rather as describing exemplary implementations. Various modification and variations may be made to these example embodiments without departing from the spirit and scope of the invention, which is limited only by the appended claims.

The invention claimed is:

1. A method for continuously updating an electronic map of a facility using a self-driving vehicle comprising a vehicle processor and at least one vehicle sensor, the electronic map comprising guiding infrastructure used for navigation by the self-driving vehicle, the method comprising operating the vehicle processor to:

operate a vehicle drive system to navigate the vehicle in a fixed-path mode during which the vehicle follows the guiding infrastructure within the facility along a defined path inside of the facility to execute one or more mission tasks;

continuously receive sensor data while in operation within the facility, using the at least one vehicle sensor, in respect of guiding infrastructure along the defined path in the facility;

compare the received sensor data to information stored in the electronic map;

determine a discrepancy between the received sensor data and the electronic map in respect of the guiding infrastructure; and update the electronic map in respect of the guiding infrastructure based on the determined discrepancy to generate an up-to-date electronic map comprising an up-to-date representation of the guiding infrastructure to at least resolve the discrepancy identified for the facility.

2. The method of claim 1, further comprising operating the vehicle processor to:

determine a location of the vehicle relative to the electronic map; and update the electronic map at the location.

3. The method of claim 2, wherein operating the vehicle processor to determine the discrepancy comprises operating the vehicle processor to determine that the electronic map includes a representation of guiding infrastructure at the location, and wherein operating the vehicle processor to update the electronic map comprises operating the vehicle processor to remove the representation of the guiding infrastructure from the electronic map at the location.

4. The method of claim 2, wherein operating the vehicle processor to determine the discrepancy comprises operating the vehicle processor to determine that the electronic map does not include a representation of guiding infrastructure detected by the vehicle at the location, and wherein operating the vehicle processor to update the electronic map comprises operating the vehicle processor to add a representation of the guiding infrastructure into the electronic map at the location.

5. The method of claim 4, wherein adding the representation into the electronic map, comprises adding one or more graph nodes into the electronic map corresponding to the detected guiding infrastructure.

6. The method of claim 5, wherein each graph node comprises data in respect of one or more of:

a pose orientation of the vehicle at the location;

a time-stamp indicating when the discrepancy was detected; or one or more sensor measurements by the at least one vehicle sensor.

7. The method of claim 1, wherein the at least one vehicle sensor comprises at least one of a light detection and ranging (LiDAR) sensor, a visual sensor, or a magnetic tape sensor.

8. The method of claim 1, wherein the electronic map is stored on a vehicle memory.

9. The method of claim 1, further comprising transmitting an updated electronic map to the fleet management system.

10. A system for continuously updating an electronic map of a facility using a self-driving vehicle, the system comprising a vehicle processor and at least one vehicle sensor, the electronic map comprising guiding infrastructure used for navigation by the self-driving vehicle, the vehicle processor being operable to:

operate a vehicle drive system to navigate the vehicle in a fixed-path mode during which the vehicle follows the guiding infrastructure within the facility along a defined path inside of the facility to execute one or more mission tasks;

continuously receive sensor data while in operation within the facility, using the at least one vehicle sensor, in respect of guiding infrastructure along the defined path in the facility;

compare the received sensor data to information stored in the electronic map;

determine a discrepancy between the received sensor data and the electronic map in respect of the guiding infrastructure; and update the electronic map in respect of the guiding infrastructure based on the determined discrepancy to generate an up-to-date electronic map comprising an up-to-date representation of the guiding infrastructure to at least resolve the discrepancy identified for the facility.

11. The system of claim 10, wherein the vehicle processor is further operable to:

determine a location of the vehicle relative to the electronic map; and update the electronic map at the location.

12. The system of claim 11, wherein the vehicle processor being operable to determine the discrepancy comprises the vehicle processor being operable to determine that the electronic map does not include a representation of guiding infrastructure detected by the vehicle at the location, and wherein the vehicle processor being operable to update the electronic map comprises the vehicle processor being operable to add a representation of the guiding infrastructure into the electronic map at the location.

13. The system of claim 12, wherein adding the representation into the electronic map, comprises adding one or more graph nodes into the electronic map corresponding to the detected guiding infrastructure.

14. The system of claim 11, wherein the vehicle processor being operable to determine the discrepancy comprises the vehicle processor being operable to determine that the electronic map includes a representation of guiding infrastructure at the location, and wherein the vehicle processor being operable to update the electronic map comprises the vehicle processor being operable to remove the representation of the guiding infrastructure from the electronic map at the location.

15. The system of claim 10, wherein the at least one vehicle sensor comprises at least one of a light detection and ranging (LiDAR) sensor, a visual sensor, or a magnetic tape sensor.

16. The system of claim 13, wherein each graph node comprises data in respect of one or more of:

a pose orientation of the vehicle at the location;

a time-stamp indicating when the discrepancy was detected; or one or more sensor measurements by the at least one vehicle sensor.

17. The system of claim 10, wherein the electronic map is stored on a vehicle memory.

18. The system of claim 10, wherein the vehicle processor is further operable to transmit an updated electronic map to the fleet management system.

* * * * *